US009074364B2

(12) United States Patent
Fisher et al.

(10) Patent No.: US 9,074,364 B2
(45) Date of Patent: Jul. 7, 2015

(54) ROTATABLE BUILDING STRUCTURE

(75) Inventors: David Fisher, Florence (IT); Laura Micol Fisher, Florence (IT)

(73) Assignee: Rotating High Towers S.A., Majuro (MH)

( * ) Notice: Subject to any disclaimer, the term of this patent is extended or adjusted under 35 U.S.C. 154(b) by 565 days.

(21) Appl. No.: 12/304,933

(22) PCT Filed: Jun. 18, 2007

(86) PCT No.: PCT/IB2007/001620
§ 371 (c)(1),
(2), (4) Date: Feb. 12, 2009

(87) PCT Pub. No.: WO2007/148192
PCT Pub. Date: Dec. 27, 2007

(65) Prior Publication Data
US 2009/0205264 A1     Aug. 20, 2009

(30) Foreign Application Priority Data

Jul. 5, 2006 (EP) .................................... 06116656
Aug. 22, 2006 (PK) ....................................... 1021/06
Aug. 23, 2006 (AU) ................................ 2006203654

(51) Int. Cl.
*E04B 1/346* (2006.01)
*B66B 9/187* (2006.01)
(Continued)

(52) U.S. Cl.
CPC .............. *E04B 1/3465* (2013.01); *B66B 9/187* (2013.01); *E04H 1/04* (2013.01); *E04H 1/06* (2013.01);
(Continued)

(58) Field of Classification Search
CPC ......... E04B 1/346; E04B 1/3465; E04H 1/04; E04H 1/06; F03D 11/04; F03D 9/00; F03D 9/002; Y02B 10/30
USPC .............. 52/64, 65, 234, 236.3, 167.1, 573.1, 52/79.1, 30; 290/55
See application file for complete search history.

(56) References Cited

U.S. PATENT DOCUMENTS 439,376 A    10/1890  Blanchard
2,771,200 A  11/1956  Gilliard
(Continued)

FOREIGN PATENT DOCUMENTS

DE    167 321     12/1904
DE    1 949 254   4/1971
(Continued)

OTHER PUBLICATIONS
International Search Report dated Jan. 24, 2008, from corresponding PCT application.

*Primary Examiner* — Brian Glessner
*Assistant Examiner* — Jessie Fonseca
(74) *Attorney, Agent, or Firm* — Florek & Endres PLLC

(57) ABSTRACT

A rotatable building structure (10) contains a vertical central core (14) for supporting suspended floor units (12) surrounding the core. An annular platform (22) extends from the core at corresponding floor units for providing accessibility to and from the central core. The floor units contain a drive mechanism (38, 40, 42) for rotational displacement. The wind load on the exterior side of each floor, and/or horizontal wind turbines that turn around the core but is a separate part of the floor itself, solar panels situated as a roof cover on top of each floor and a wind tool (46) deployable from the floor unit provides alternative wind power assist for rotating the floor units.

43 Claims, 25 Drawing Sheets

(51) Int. Cl.
*E04H 1/04* (2006.01)
*E04H 1/06* (2006.01)
*F03D 9/00* (2006.01)
*F03D 11/04* (2006.01)

(52) U.S. Cl.
CPC *F03D 9/00* (2013.01); *F03D 9/002* (2013.01); *F03D 11/04* (2013.01); *F05B 2240/91* (2013.01); *F05B 2240/911* (2013.01); *F05B 2240/9112* (2013.01); *Y02B 10/30* (2013.01); *Y02E 10/725* (2013.01); *Y02E 10/728* (2013.01)

(56) References Cited

U.S. PATENT DOCUMENTS

| | | | |
|---|---|---|---|
| 2,927,599 A * | 3/1960 | Stetson | 137/247 |
| 3,156,017 A * | 11/1964 | Faerber | 52/65 |
| 3,299,588 A * | 1/1967 | Arnold | 52/65 |
| 4,694,620 A * | 9/1987 | Pope | 52/65 |
| 4,969,300 A * | 11/1990 | Pope | 52/65 |
| 5,205,768 A | 4/1993 | Pollack | |
| 6,358,561 B1 * | 3/2002 | Mentone et al. | 427/188 |
| 6,457,280 B1 * | 10/2002 | Park | 52/65 |
| 6,518,680 B2 | 2/2003 | McDavid, Jr. | |
| 6,742,308 B1 * | 6/2004 | Johnstone et al. | 52/65 |
| 7,536,831 B2 * | 5/2009 | Ratliff et al. | 52/65 |
| 2002/0129564 A1 * | 9/2002 | Park | 52/64 |
| 2002/0180216 A1 | 12/2002 | McDavid, Jr. | |
| 2003/0035725 A1 * | 2/2003 | Sosonkina | 416/11 |
| 2003/0111844 A1 | 6/2003 | McDavid, Jr. | |
| 2004/0103594 A1 * | 6/2004 | Johnstone et al. | 52/65 |
| 2006/0201071 A1 * | 9/2006 | Johnstone et al. | 52/65 |
| 2006/0230690 A1 * | 10/2006 | Dunick | 52/64 |
| 2006/0248808 A1 * | 11/2006 | Franco et al. | 52/64 |
| 2007/0252390 A1 | 11/2007 | Gordon | |

FOREIGN PATENT DOCUMENTS

| | | |
|---|---|---|
| DE | 23 18 203 | 10/1974 |
| DE | 2318203 A * | 10/1974 |
| DE | 101 12 334 | 9/2002 |
| EP | 1 635 110 | 3/2006 |
| FR | 1 434 354 | 6/1966 |
| FR | 2 429 956 | 1/1980 |
| JP | 2005171683 A * | 6/2005 |
| WO | 98/37293 | 8/1998 |
| WO | 02/40861 | 5/2002 |
| WO | 2005/052362 | 6/2005 |

* cited by examiner

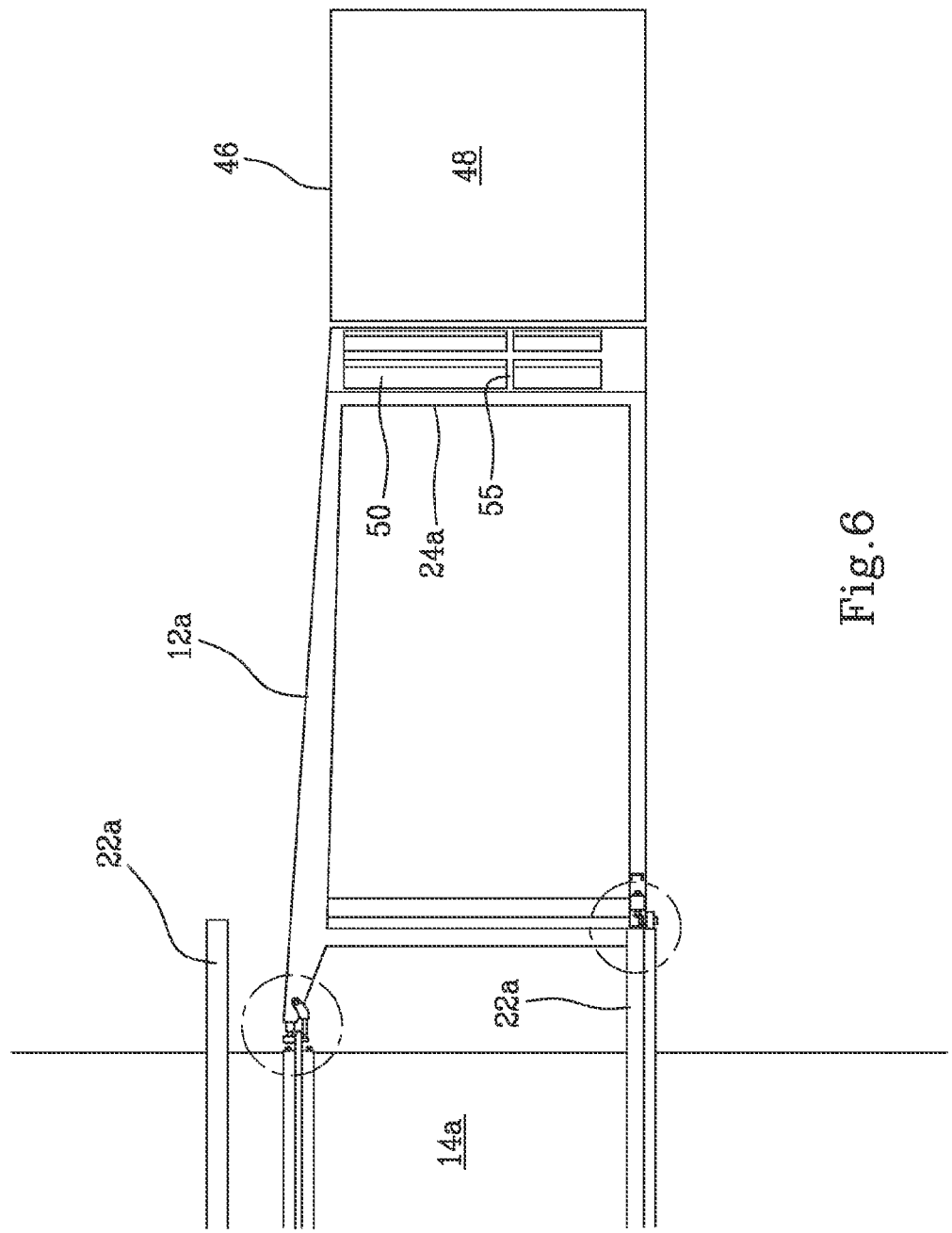

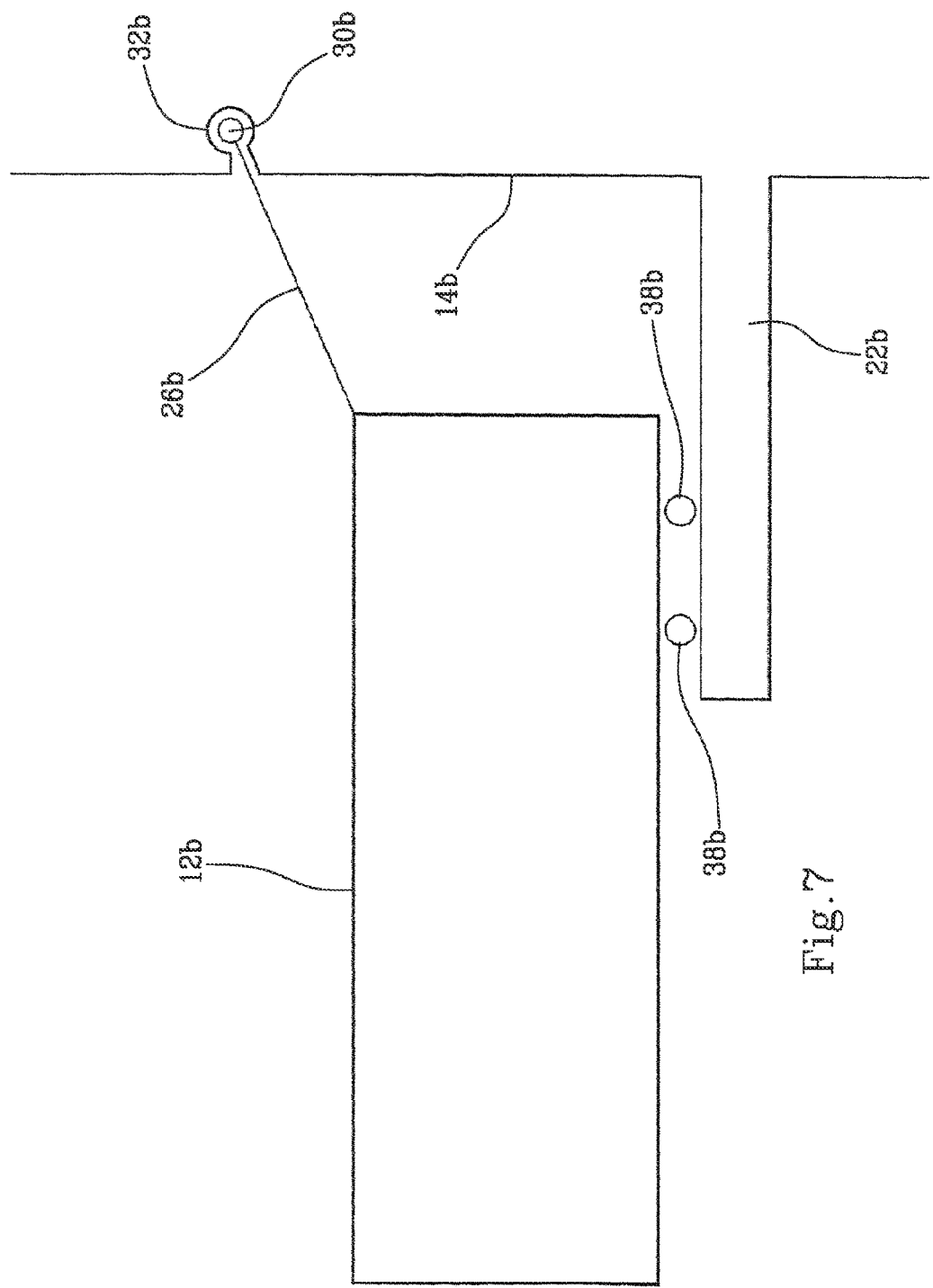

ROTATABLE BUILDING STRUCTURE

FIELD OF THE INVENTION

This invention relates to static structures and especially to a structure mounted for in situ repositioning.

In particular, the structure of this invention concerns a building having floor units that are rotatable about a vertical axis.

BACKGROUND INFORMATION

The ability of an apartment to command a desirable view is a recognizable factor in determining the salability and economic value of the apartment. However, most buildings have only a limited number of apartments with highly desirable exposures. A solution to this problem is to provide a changeable environment by in situ repositioning of the building. Typically, repositionable building structures were designed with an outer casing rotatably mounted on a spindle; the structures were used principally for observation towers, amusement devices, and/or restaurants for providing patrons with changeable views and not for apartment, hotel and similar dwellings; examples of such structures are shown in U.S. Pat. Nos. 3,905,166, 6,742,308, and 841,468.

A limitation of these structures is that they are not intended primarily for use as multi-story apartment buildings or hotels or for providing selective 360° viewing capability. Another shortcoming is that lack of floor independence decreases load stability.

BRIEF SUMMARY OF THE INVENTION

Briefly, the nature of this invention involves a building structure having a vertically disposed central core with plural horizontal floor units suspended from and surrounding the core at incremental heights for transferring balanced vertical loading through the core. An annular platform extending horizontally from the core, in correspondence with the floor units, provides a corridor for accessing the central core. The floor units are independently displaceable about the core, for example, by motor-power actuation, wind-power, hydraulic power, electro-magnetic energy, or other drive force.

In view of the foregoing, it should be apparent that the present invention overcomes the limitations of the prior art and provides an improved rotatable building structure. Having thus summarized the invention, it will be seen that it is an object thereof to provide a rotatable building structure of the general character described herein which is not subject to any of the aforementioned limitations.

Another object of this invention is to provide a rotatable building structure suitable for high-rise or low-rise buildings.

A further object of this invention is to provide a rotatable building structure with independently rotatable suspended floor units that provide improved seismic stability.

A still further object of this invention is to provide a rotatable building structure wherein the configuration of the floor units can optionally be varied in shape such that the profile of the building will continually change during rotation of the floor units.

Still another object of this invention is to provide a rotatable building structure including a stationary platform providing an access way from the floor unit to the central core.

Yet another object of this invention is to provide a rotatable building structure having single or multiple vertical cores for supporting the floor units.

Still yet another object of this invention is to provide a rotatable building structure wherein displacement of the floor units are computer-controlled and actuatable on command.

Yet still a further object of this invention is to provide a rotatable building structure having prefabricated furnished floor units to facilitate erection and onsite installation.

Yet still another object of this invention is to provide a rotatable building structure with aerodynamically designed floor units that can be repositioned to reduce wind load, as in a hurricane.

Yet still another object of this invention is to provide a rotatable building structure that generate energy through the wind pressure on the building's facades by transforming the wind load in electrical power.

Yet still another object of this invention is to provide a rotatable building structure that generate energy through the wind pressure on horizontal wind turbines structure that is separate from the floors themselves and rotate according to the wind pressure transforming the wind load in electrical power, providing alternative wind power assist for rotating the floor units and/or for the consumption of the building itself or of another building.

Yet still another object of this invention is to provide a rotatable building structure that generate energy through solar panels situated on top of each floor as this type of building has a number of roofs, equal to the number of floors, where solar panels can be installed, generating electrical power.

According to a further aspect of the invention, a structure of lighting movable elements arranged at the exterior of multi-floor buildings is also disclosed.

Namely, the invention refers to lighting movable elements radially arranged around a building axis and between the building floors or situated on the floor themselves with a self rotating system, in which the elements have mechanisms to rotate around the building axis and to move towards the building and back.

The aim of the movements of the lighting elements, controlled and coordinated by an electronic processor unit is to make the building to appear as moving and changing in shape according to their position and their speed.

It should be appreciated that on daytime the aesthetic view of a building depends on the natural light, which emphasize the shape, the details and the materials of the building, while on night-time, it depends only on the artificial lighting of which the building is provided.

At the time being, the artificial lighting of buildings is generally given either by projecting a light from the exterior, or by the lighting system of the building itself. Therefore, in absence of an external lighting system, only the lights of the building, which emit light without illuminating the building surface, make the building visible form the outside night-time.

In this connection, is an object of the invention to provide a plant of lighting movable elements giving the optical effect of a building which is movable together with the lighting elements.

Other objects of this invention will in part be apparent and in part will be pointed out hereinafter.

With these ends in view, the invention finds embodiment in certain combinations of elements and arrangements of parts by which the aforementioned objects and certain other objects are hereinafter attained, as more fully described with reference to the accompanying drawings and the scope of which is more particularly pointed out and indicated in the appended claims.

BRIEF DESCRIPTION OF THE DRAWINGS

In the accompanying drawings, in which are shown an exemplary embodiments of the invention:

FIG. 6 is an elevation view of an alternate embodiment of the rotatable building structure of this invention showing a floor unit with a wind tool in operational position for providing wind-power assist during rotational displacement of the floor unit around the central core;

FIG. 7 is a schematic illustration of an alternate embodiment of the rotatable building structure of this invention showing a platform with a track for supporting a floor unit;

The floors therefore do not transmit the forces from one to the other floor and even the main structure vibrate, the floors will maintain their solidity and resist to high seismic event.

Figure 10:
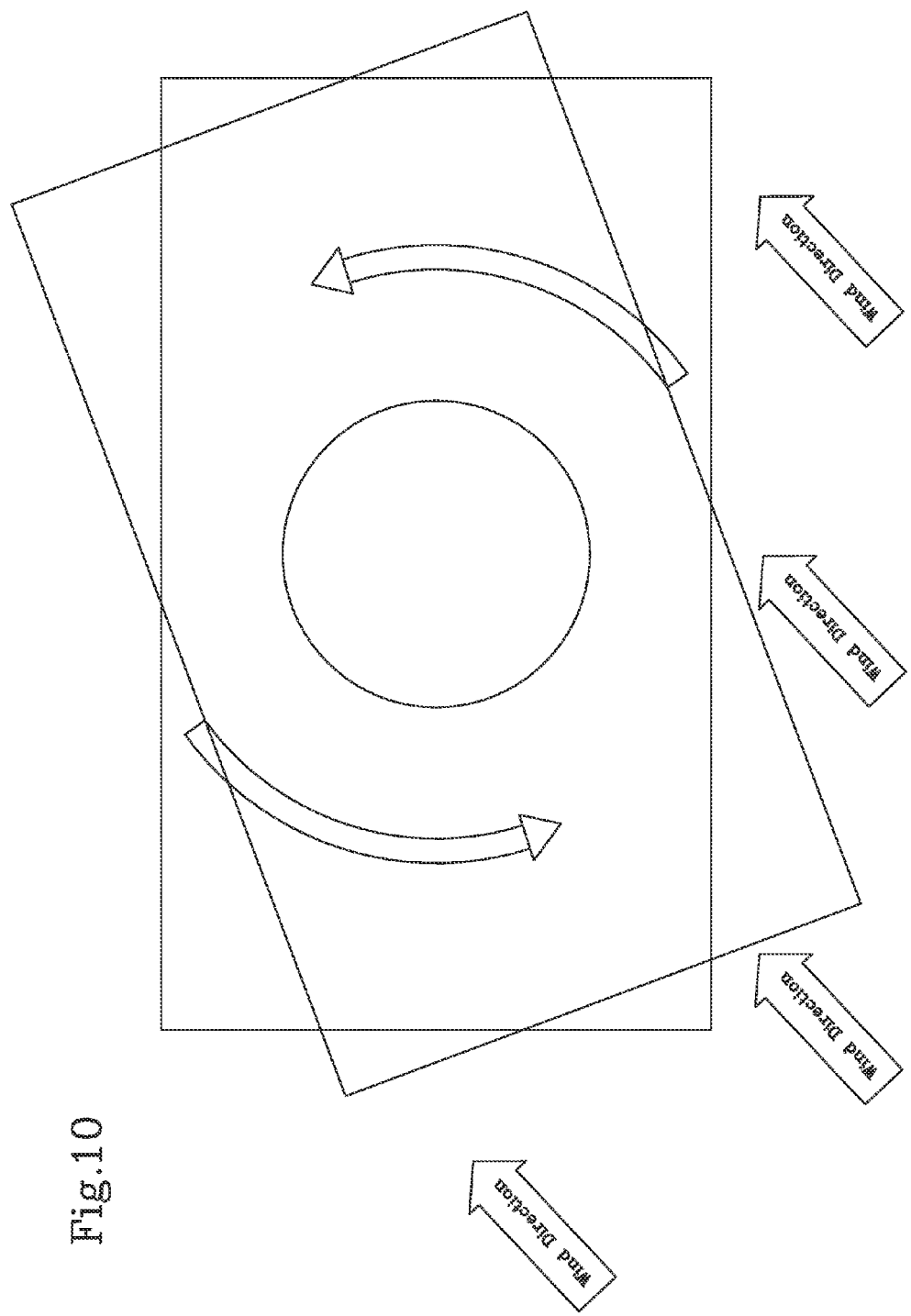

FIG. 10 is a schematic illustration showing the wind load on the building that by forcing resistance to the natural movement create by the wind load (through stopping or slowing the movement) create energy to be transformed to electrical energy.

Figure 11:
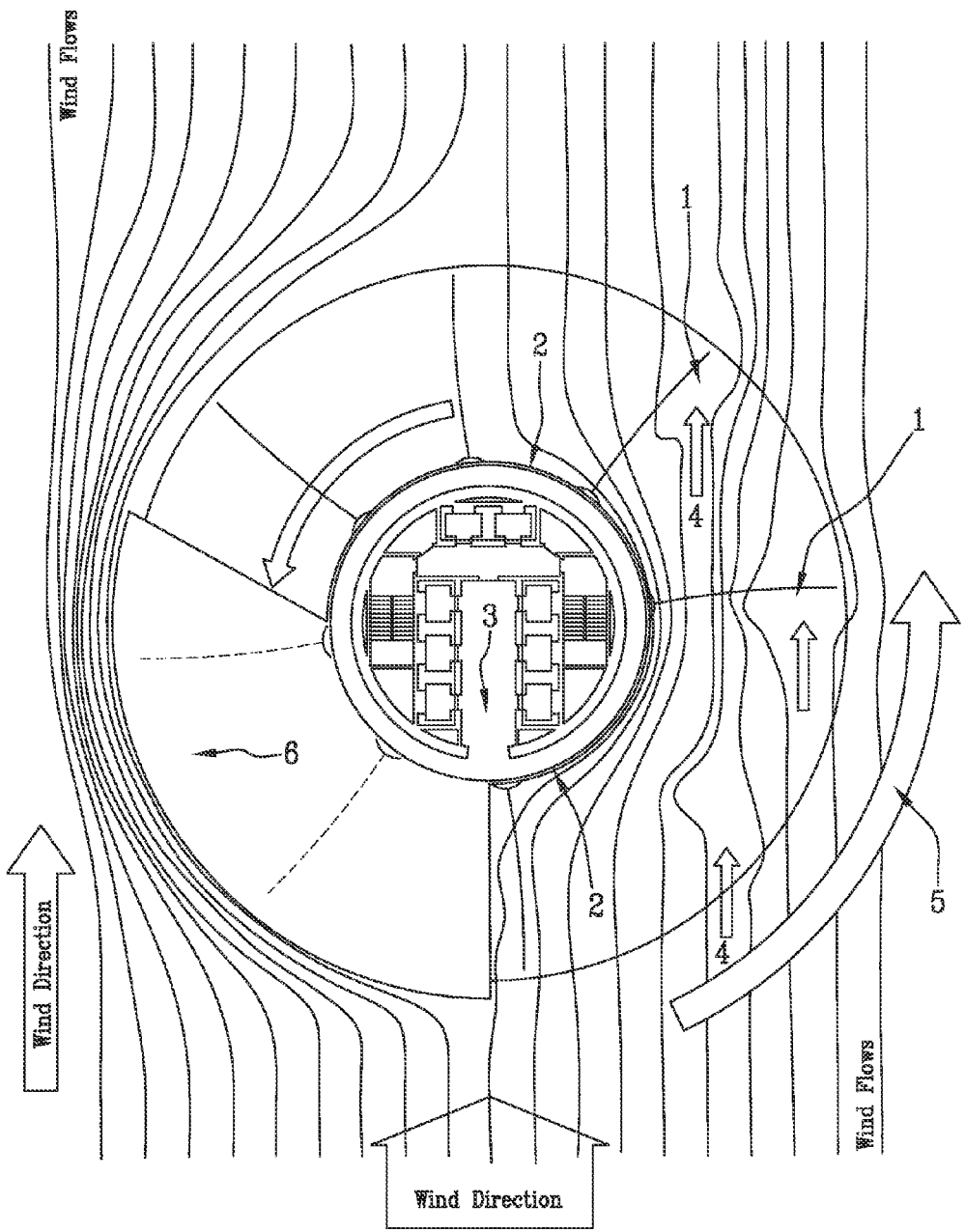
Figure 11A:
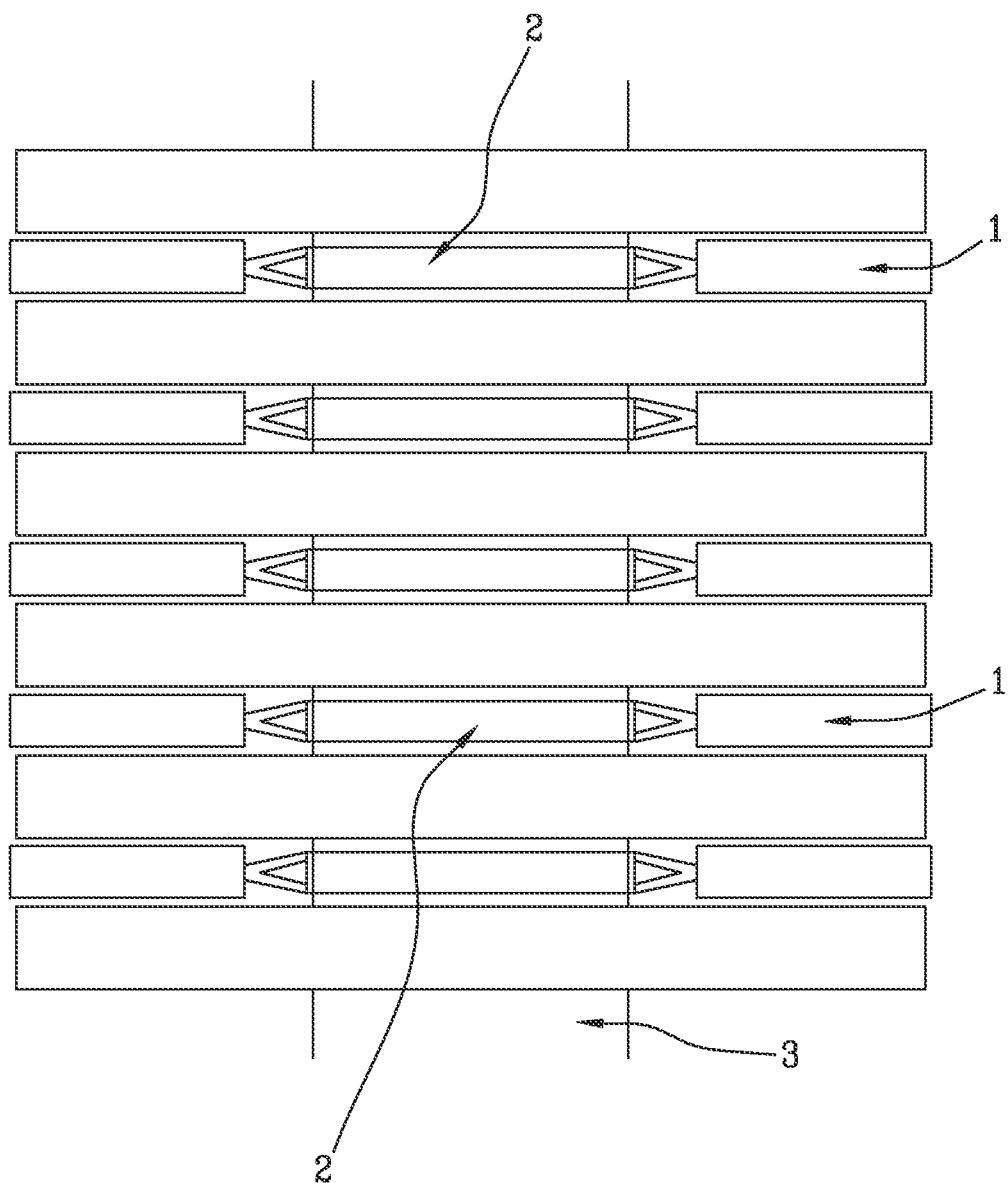

FIG. 11 and FIG. 11A are schematic illustrations showing that the single floors, being distanced one from the other, will allow to have an horizontal "wind turbines" between each floor, of independent movement and separate from the floors themselves, that will turn round due to the wind load and according to the wind velocity, creating electric power to be used as part of the building consumption.

The system is made of wind catching wings (1) connected to a wheel (2) rotating around the central structure of the building (3). The wind move the wings in the direction of the wind (4) impressing a rotational movement (5) to the wheel that can be converted in electricity. A rotating shield (6) is mechanically aligned to the wind through a computerised sensor in order to avoid the wind force to act on the wings when they are turning back against the wind direction.

Figure 12:
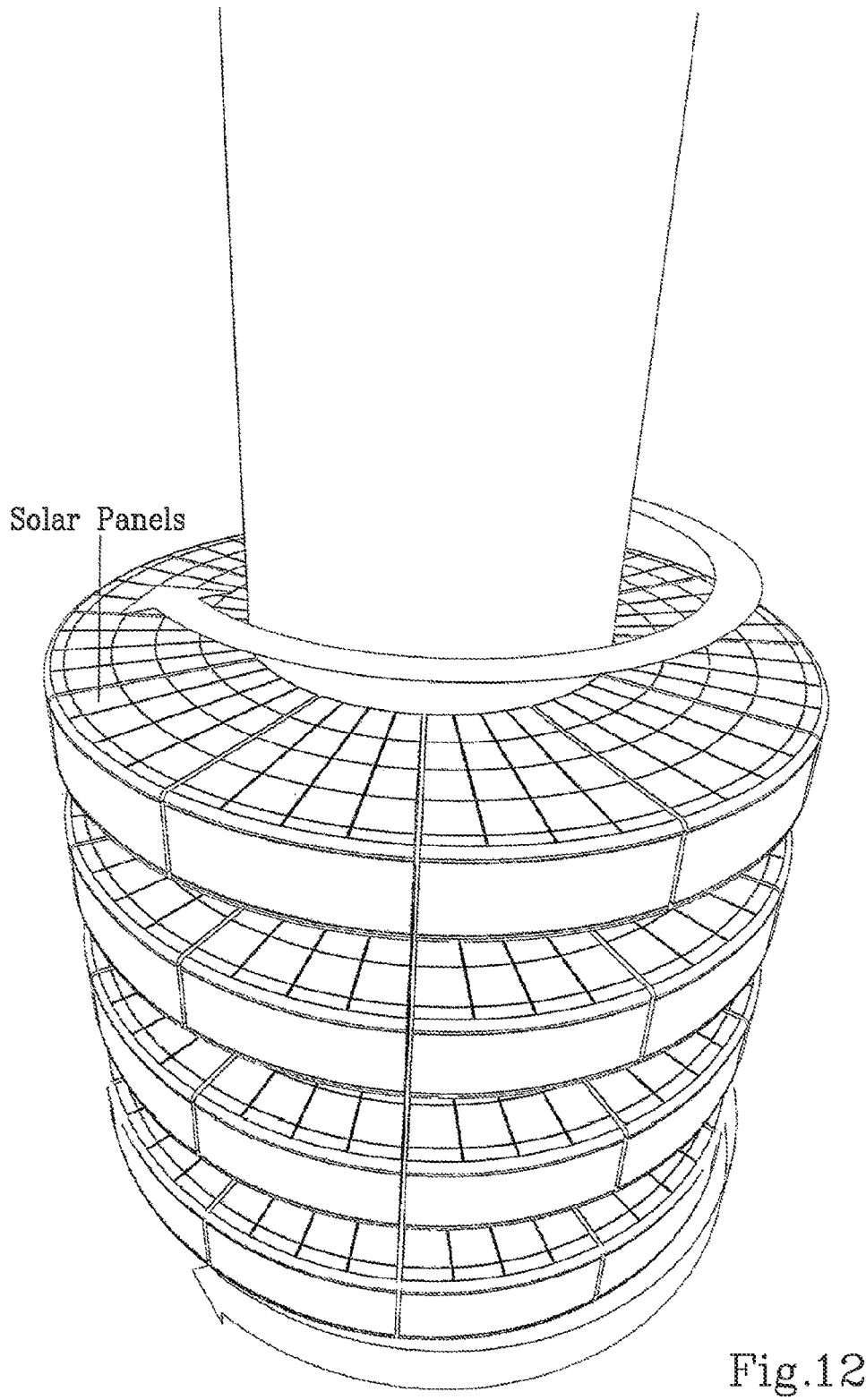

FIG. 12 is a schematic illustration showing that this type of building has many roofs, as the number of the floors, and each roof is covered with solar panels for the production of energy.

Figure 13:
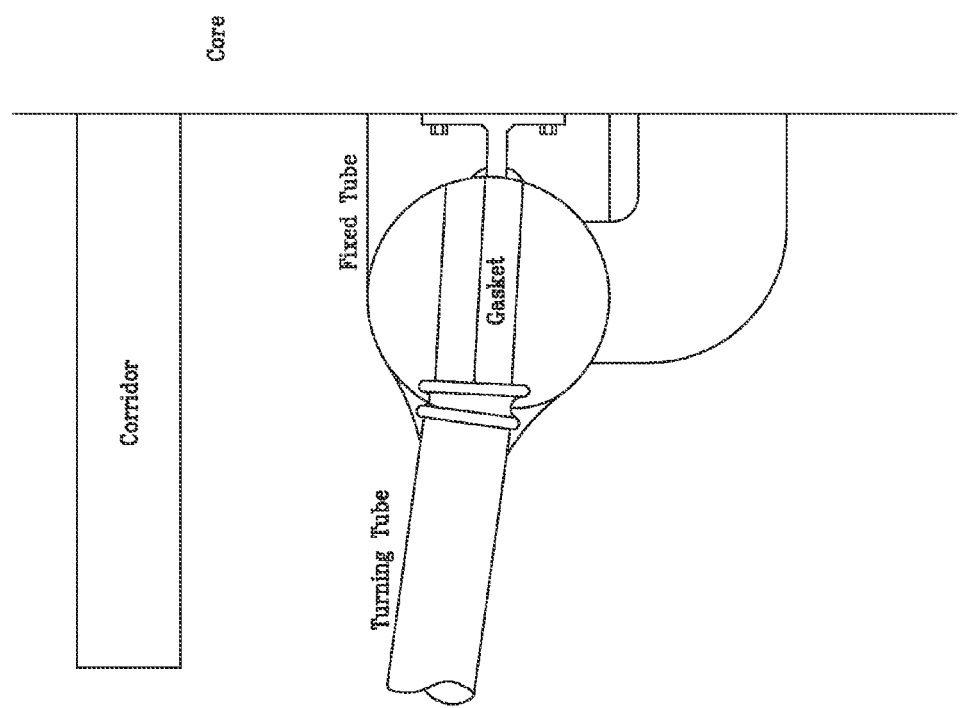

FIG. 13 is a schematic illustration showing the plumbing system solution as the vertical piping system inside the core is fixed while the plumbing system of the single floors are rotating around. To allow such connection between the a fixed pipe and the rotating pipe there is one connection in each floor where the rotating pipe is inserted inside the fixed pipe in a way that one is fixed while the other one in partly inserted in the other one rotating around, allowing the water flow for clear water, for waist water or for air conditioning cold water to flow continuously.

Figure 13A:
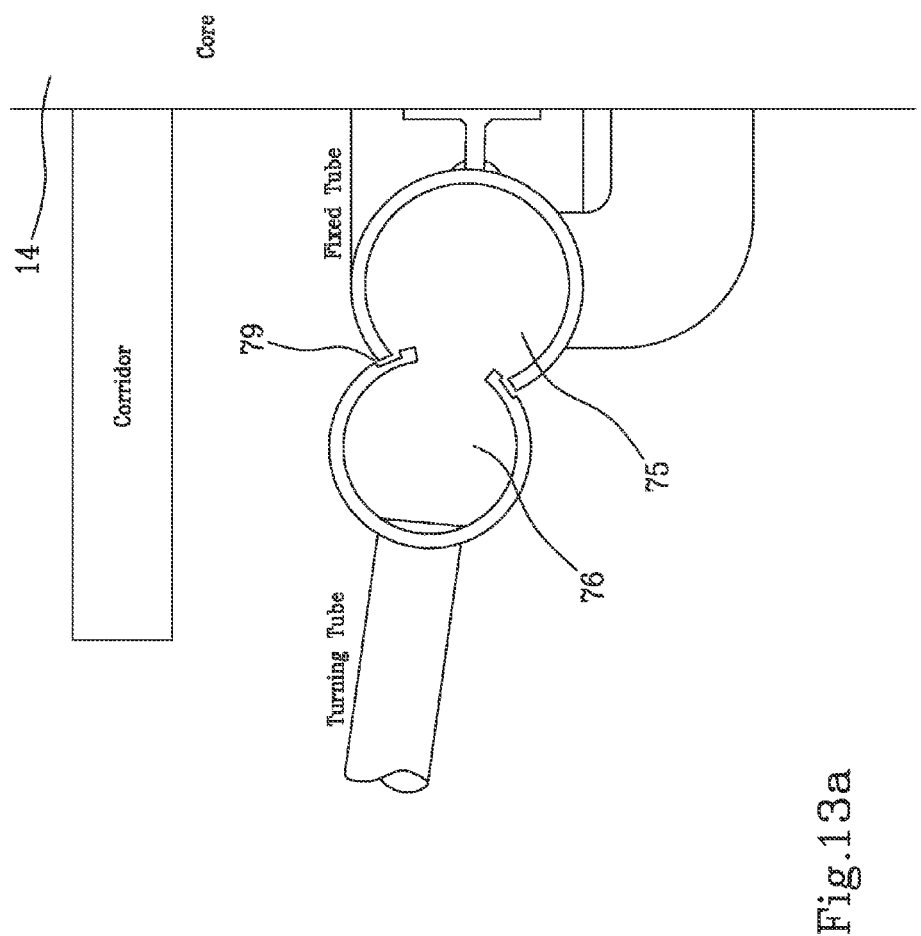

FIG. 13a is a schematic illustration showing a plumbing system of the building, providing a first toroidal pipe fixed the core unit and a second toroidal pipe fixed to a floor allowing fluid communication between the central unit pipe and the floor pipe; These two pipes, made as two connected and parallel rings are inserted one into the other allowing the exterior one to rotate "around" the other one and in the same time "inside" the other one. In fact, the entry and exit pipes into these two rings changes their position in relation of one to the other.

Figure 13B:
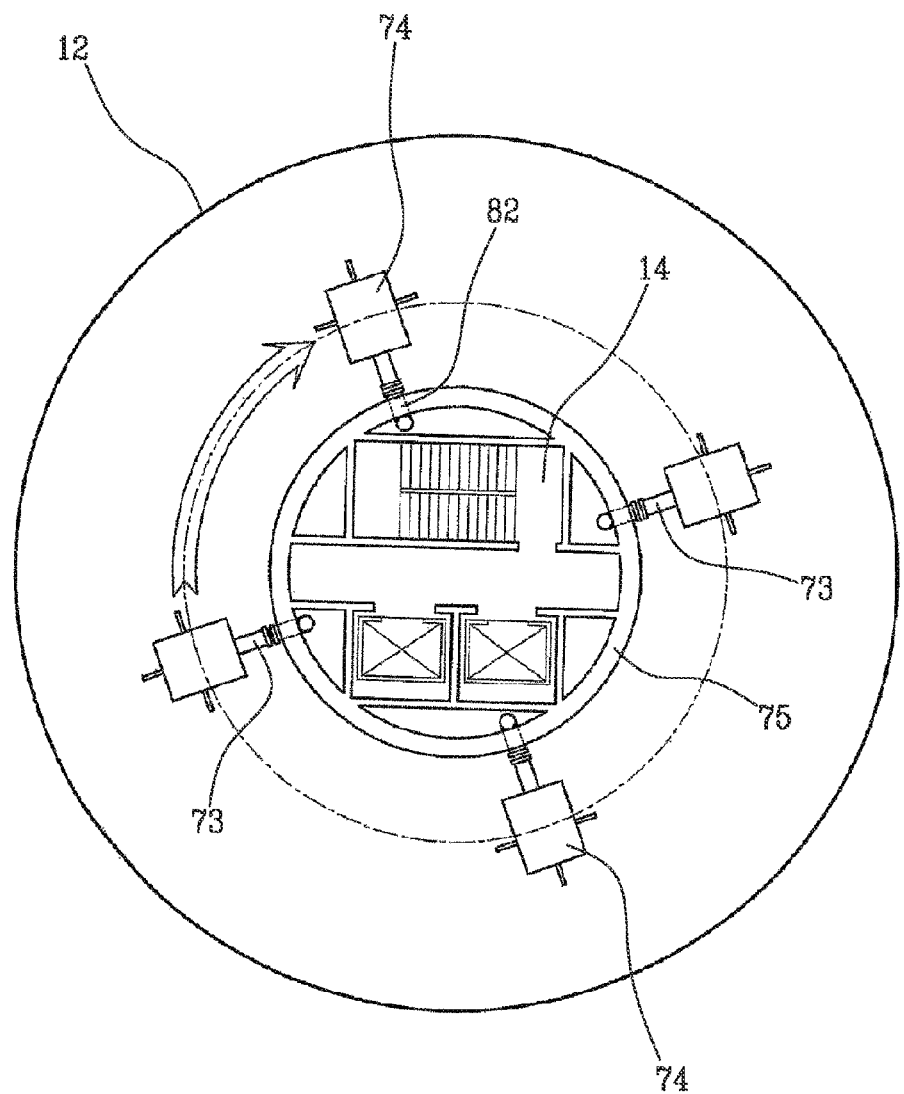

FIG. 13b is a schematic illustration of a plumbing system of the building in which a pipe fixed to the core having a number of connection fittings (in this figure four fittings are indicated) while the rotating floor has its own pipe with its own connection fittings situated in the same distance and parallel position. At a certain moment of the rotation the connection fittings correspond between themselves, the rotatable floor stop for a short time and the fittings get connected automatically allowing the liquids to flow from one side to the other. The rotatable part is equipped with tanks that get filled during this short time in which the floor in not rotating.

Figure 13C:
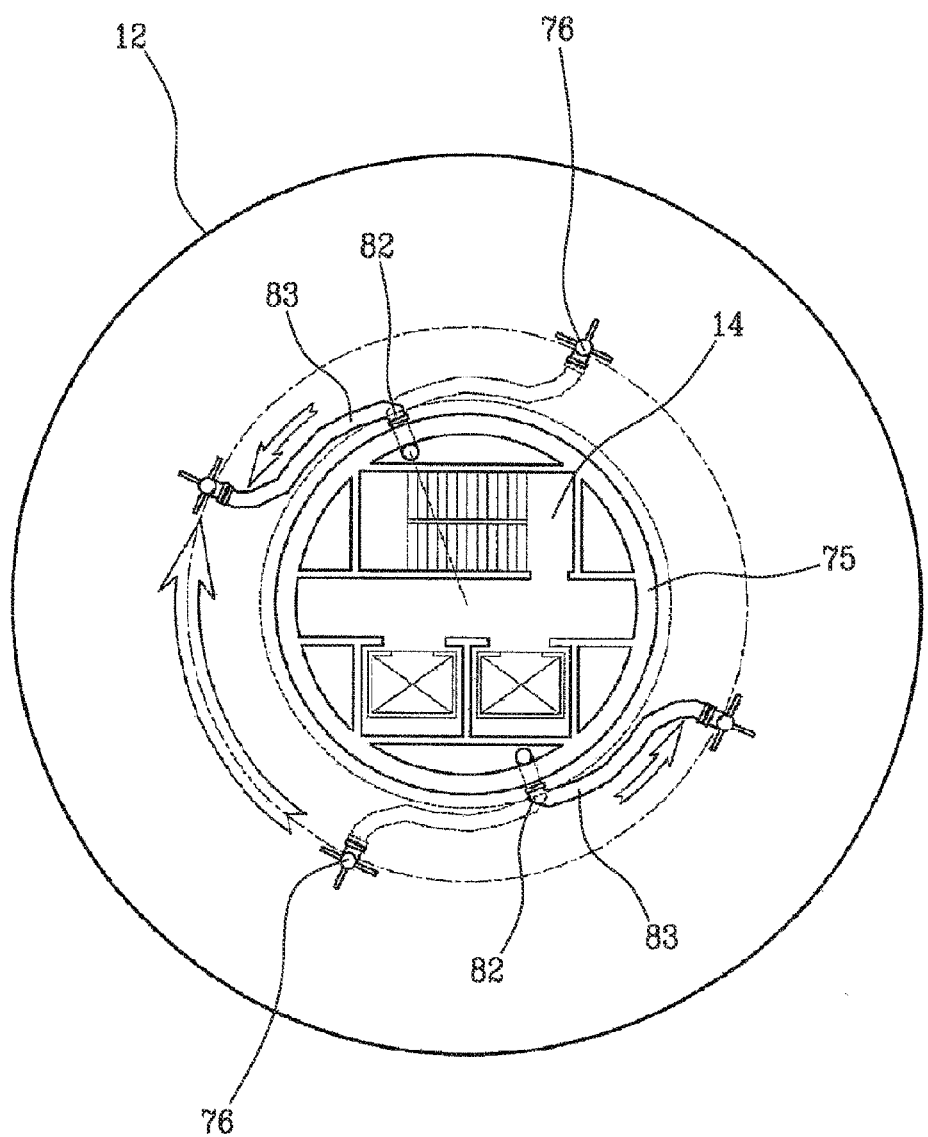

FIG. 13c is a schematic illustration of a plumbing system of the building in which a pipe fixed to the core unit is connected with at least one flexible pipe of a floor through movable connections arranged to allow fluid communication between the central unit pipe and the floor pipes.

A flexible pipe coming out of the exterior side of the main core, is attached to the connection fitting on the rotatable side. When the flexible pipe get completely stretched due to the movement of the rotatable floor the pipe gets disconnected and automatically connected to the other fitting creating a new connection for the flow of the liquids (or semi solid material). Having two sets of this flexible pipe on each floor will guarantee continuous flow and water pressure for each floor, needed to "cover" the short time between disattachment and attachment of the single flexible pipe. A water tank on each floor may be installed on each rotating floor for a back up purpose.

Figure 14:
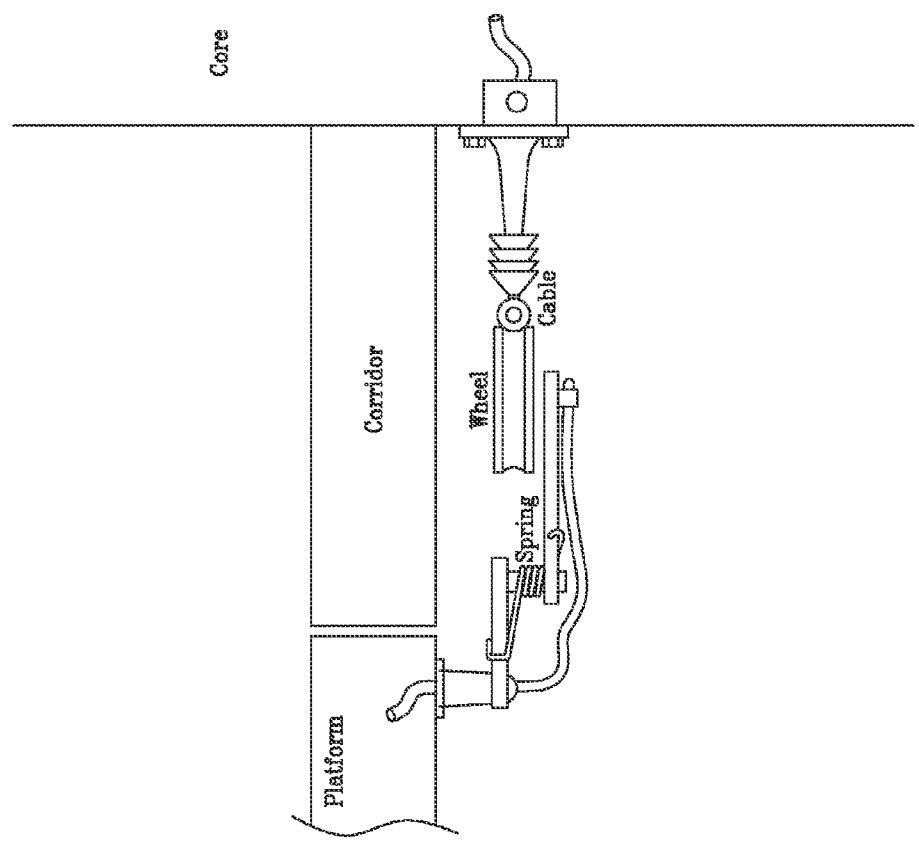

FIG. 14 is a schematic illustration showing the electrical connection between a rigid electric wire and a rotating wire, similar to any electric transmission in movement.

Figure 15:
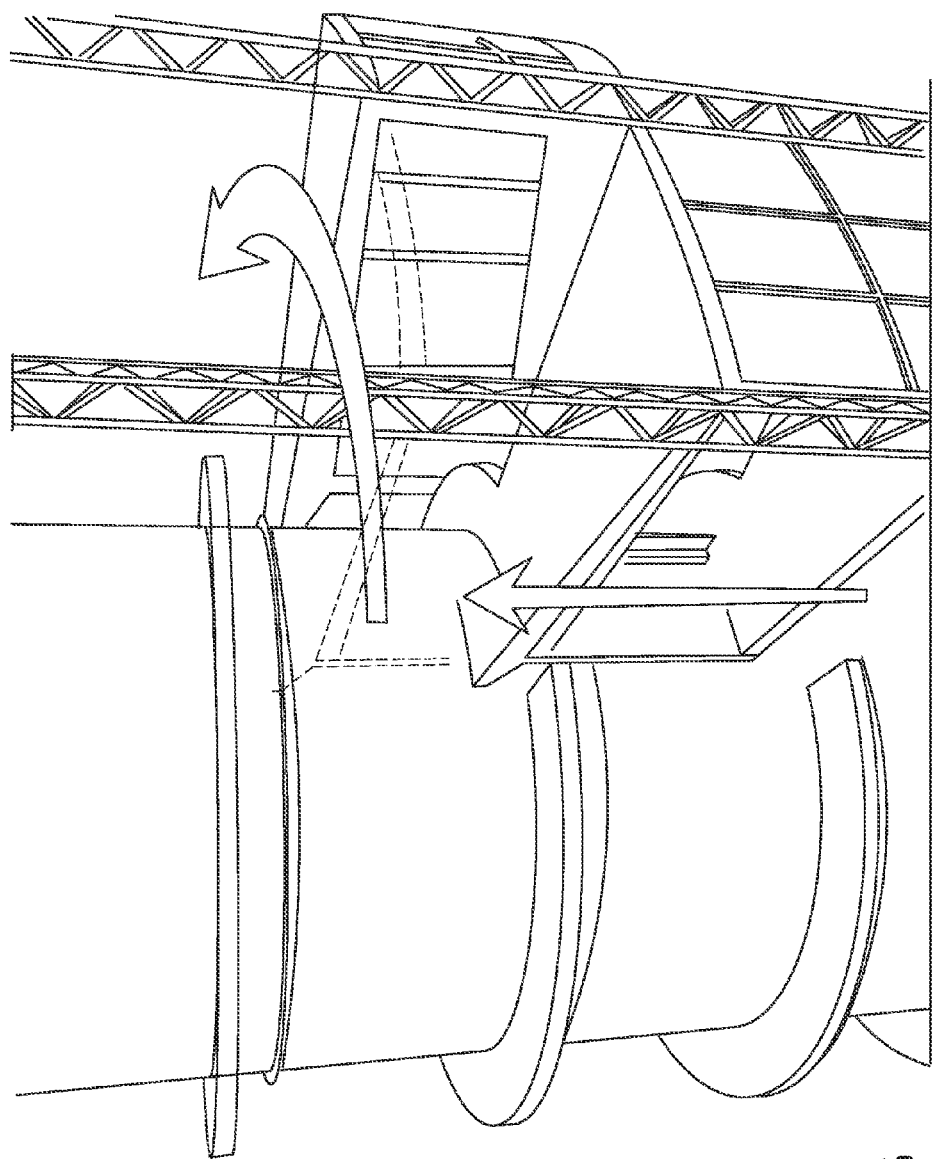

FIG. 15 is a schematic illustration showing the prefabrication and installation process of the single prefabricated units that are lifted up along the core and then mechanically installed creating a finished floor in very short time and limited number of unskilled workers.

Figure 15A:
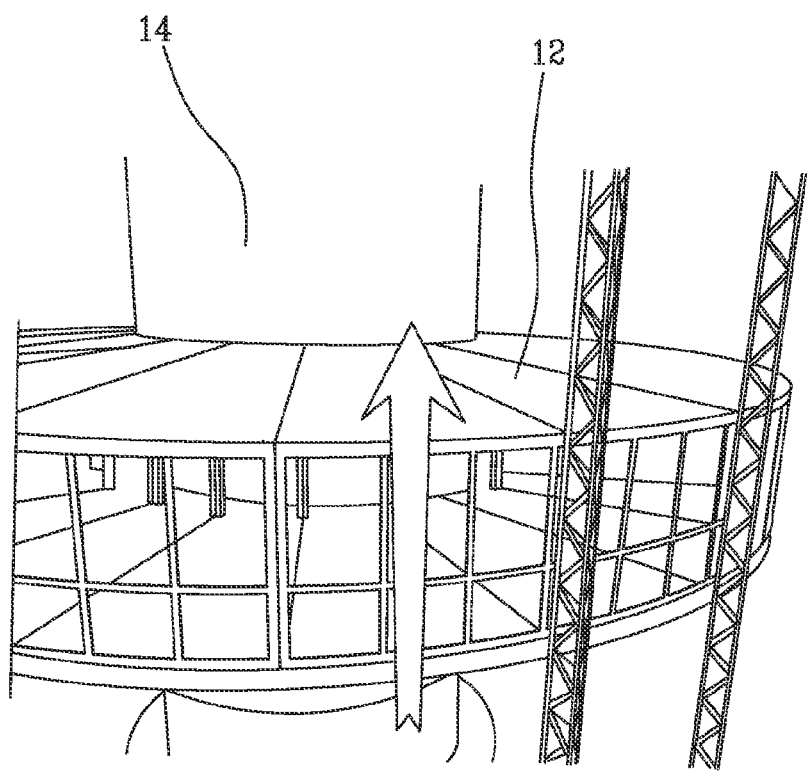

FIG. 15a is a schematic illustration showing the installation process of a whole pre-assembled floor which is assembled at the lower level, then is lifted up along the core and fixed at the final level.

Figure 16:
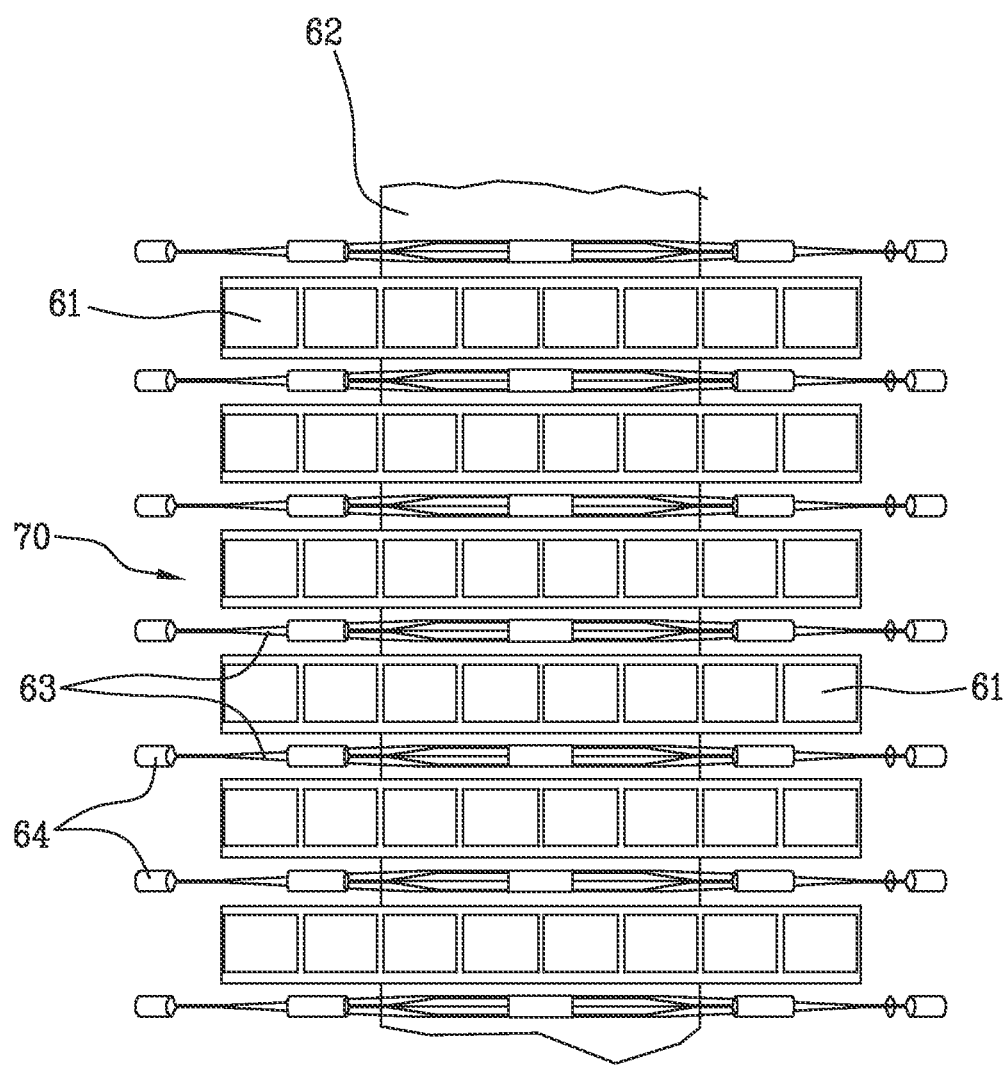

FIG. 16 is a schematic view of a building according to a further aspect of the invention, having lighting movable elements; The lighting system that can have a different position and speed in relation to the floors can create different images of the building at night time.

Figure 17:
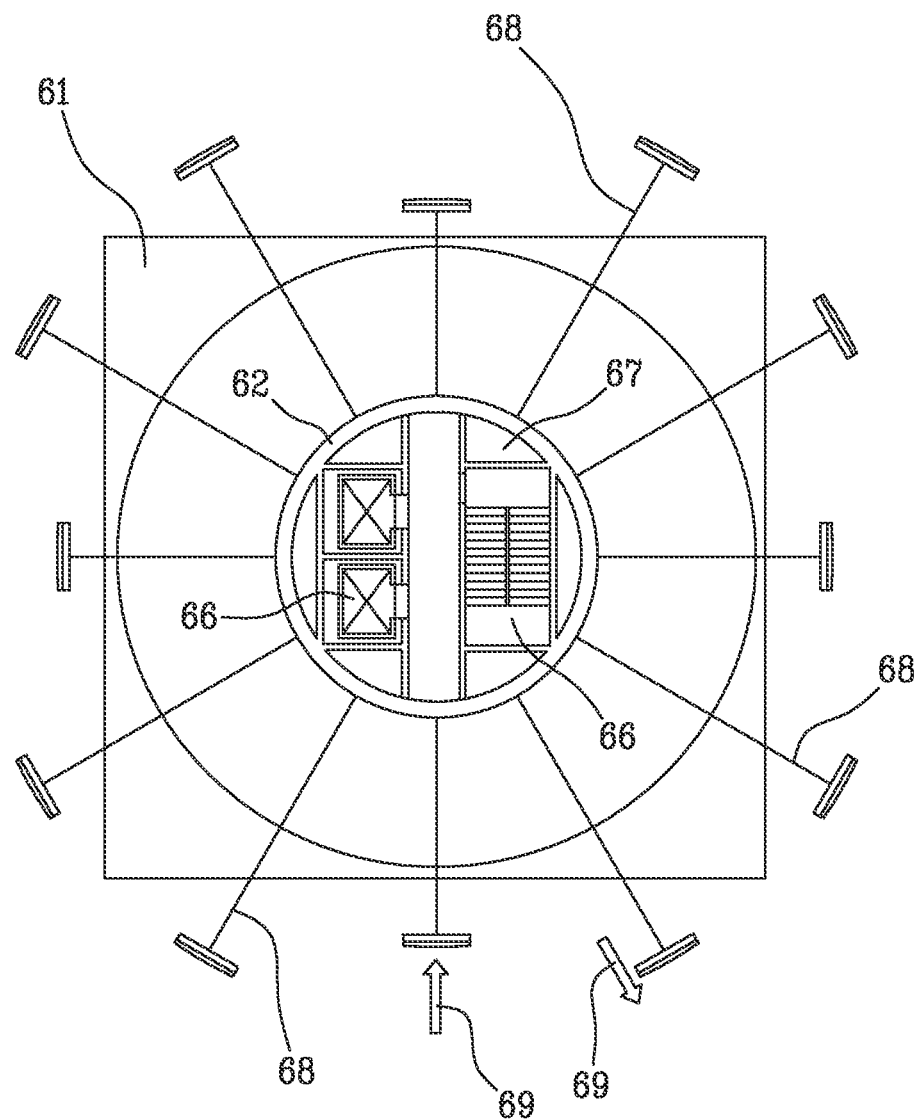
Figure 18:
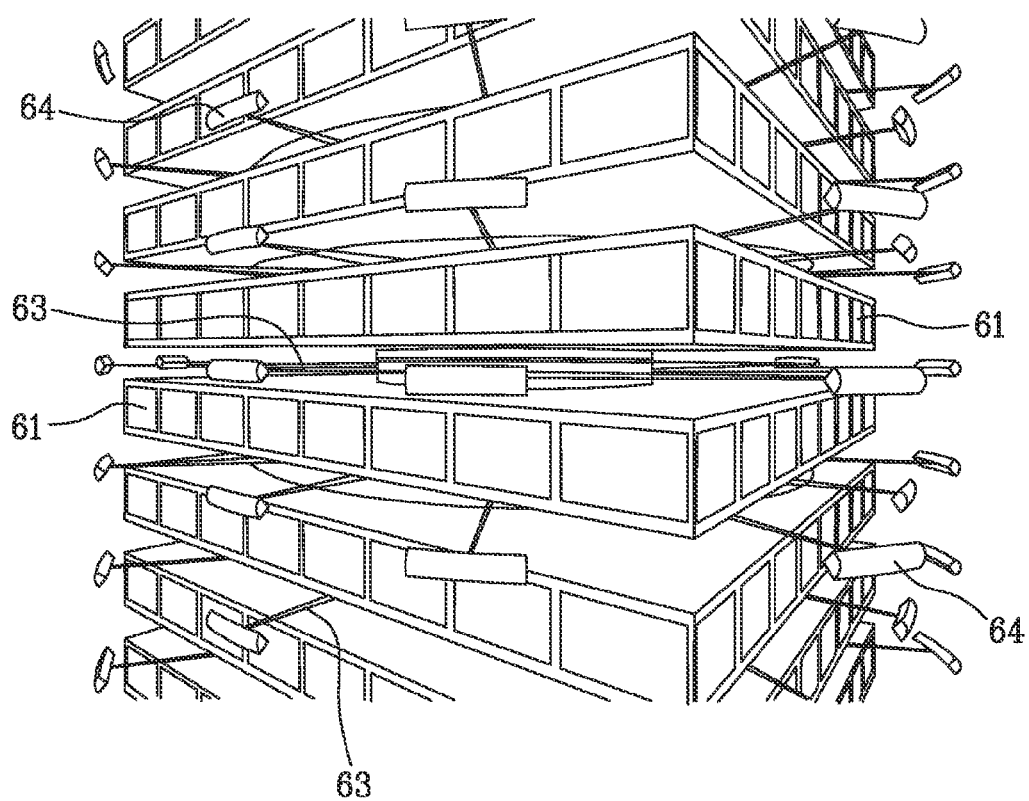
Figure 19:
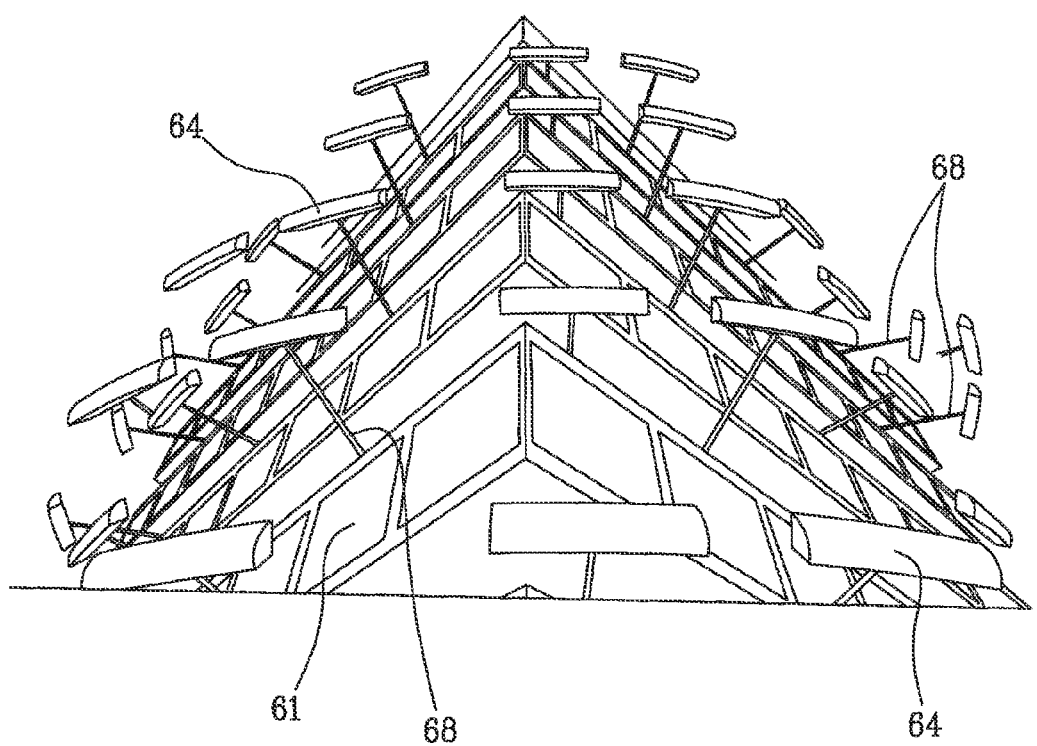

FIG. 17 is a plant view of the building of FIG. 16;

FIGS. 18 and 19 are prospective views of the building of FIG. 15, in which lighting movable elements are provided between the building floors.

Figure 20:
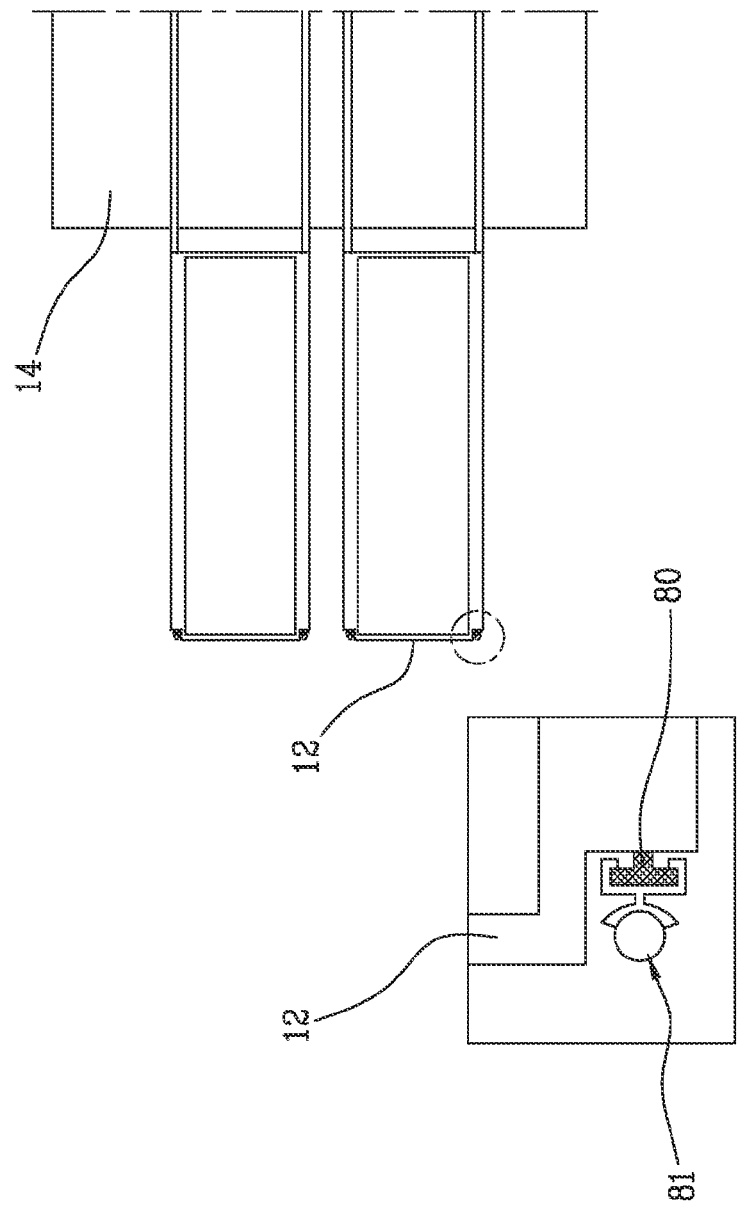

FIG. 20 is a schematic views of a building of the invention having lighting movable elements arranged on a building floor to independently rotate in respect of a building central unit.

DETAILED DESCRIPTION OF THE INVENTION

With specific reference now to the figures in detail, it is stressed that the particulars shown are by way of example and for the purposes of illustrative discussion of the preferred embodiments of the present invention only and are presented in the cause of providing what is believed to be the most useful and readily understood description of the principles and conceptual aspects of the invention. In this regard, no attempt has been made to show aspects of the invention in more detail than is necessary for a fundamental understanding of the invention, the description taken together with the drawings should make it apparent to those skilled in the art how the several forms of the invention may be embodied in practice.

Figure 1:
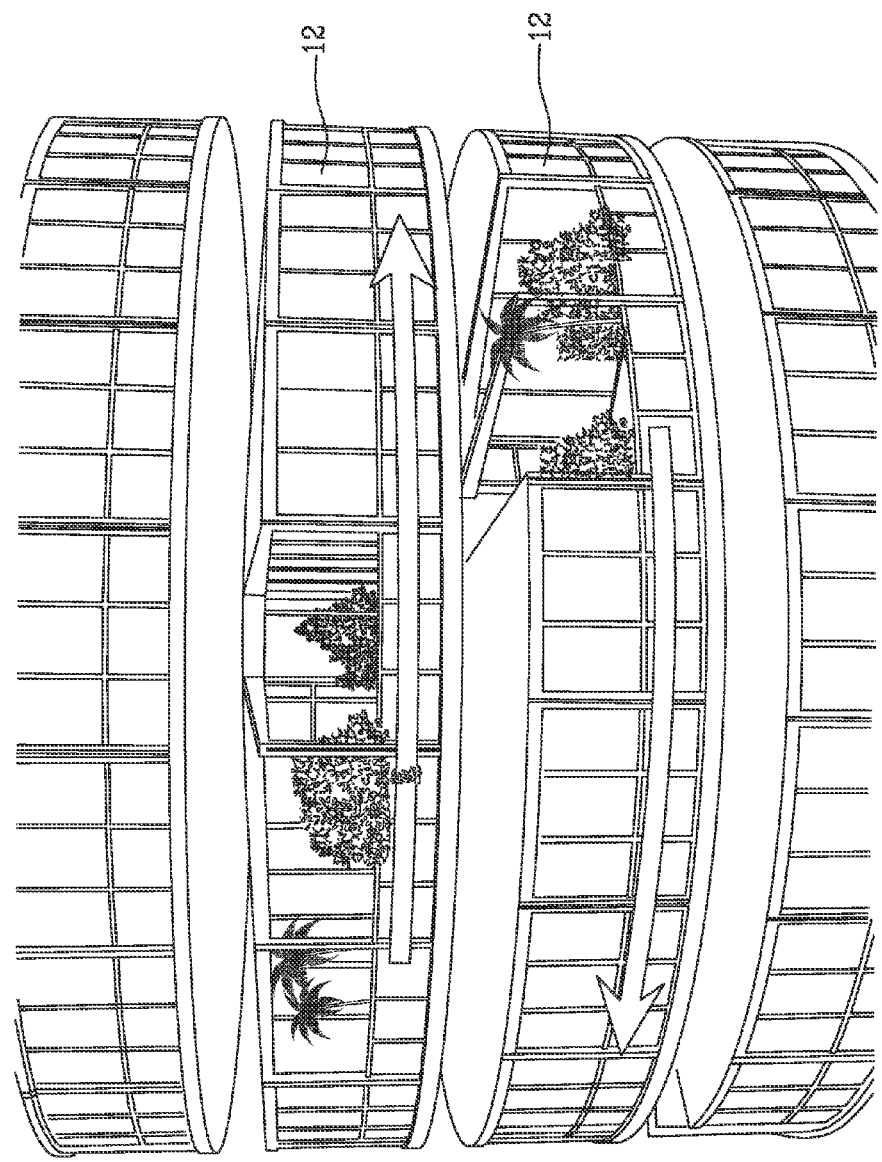
FIG. 1 is a perspective new illustrating a portion of a multi-story building in accordance with this invention having independently rotatable floor units surrounding a central core.

Referring now in detail to FIG. 1 of the drawings, there is shown a portion of a multi-level rotatable building structure 10 having an independently rotatable suspended floor unit 12. It should be understood that the structure of this invention encompasses application to high-rise and/or low-rise buildings. The arrows are intended to show that each of several floor units 12 can rotate in opposite circular directions or optionally can rotate in the same circular direction. The floor units can also operate at different speeds.

Figure 2:
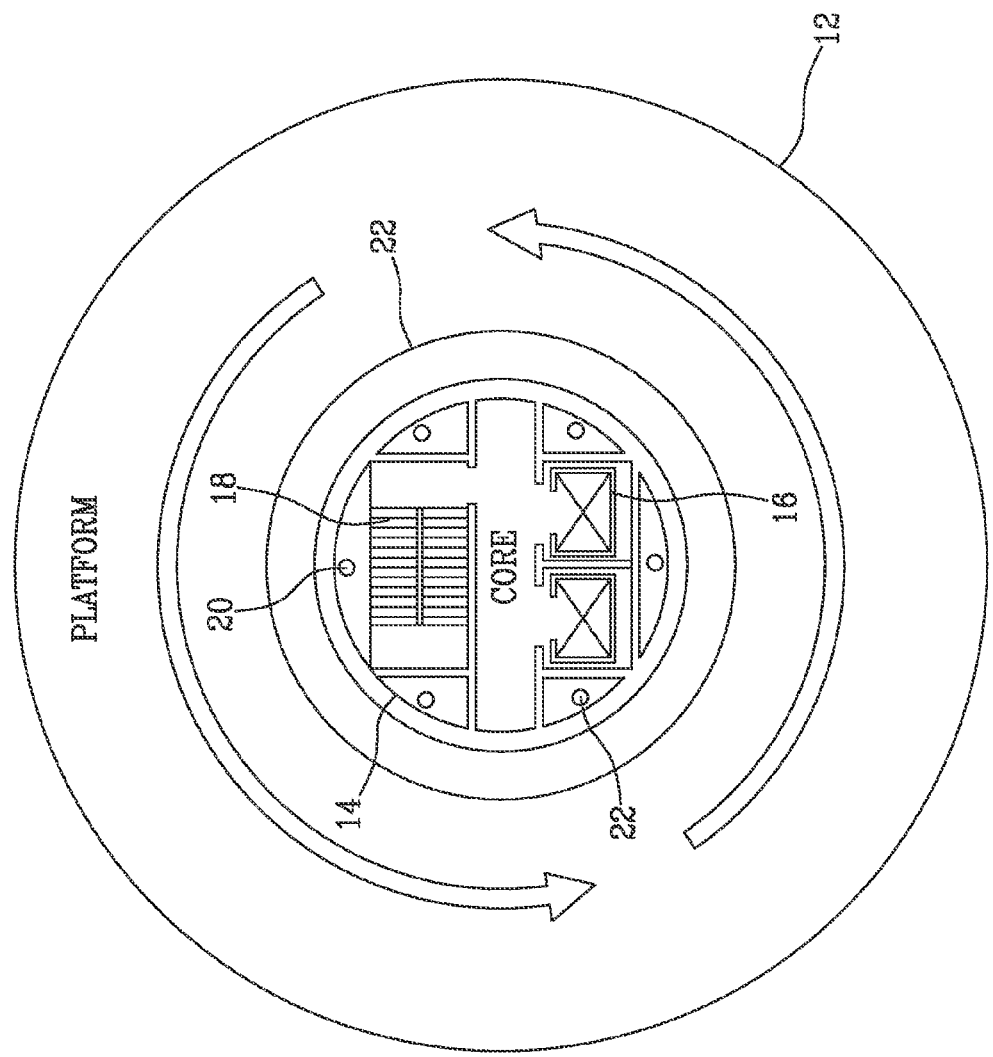
FIG. 2 is a plan view of the rotatable building structure of this invention showing a central core, a platform projecting from the central core and the floor units.
Figure 8:
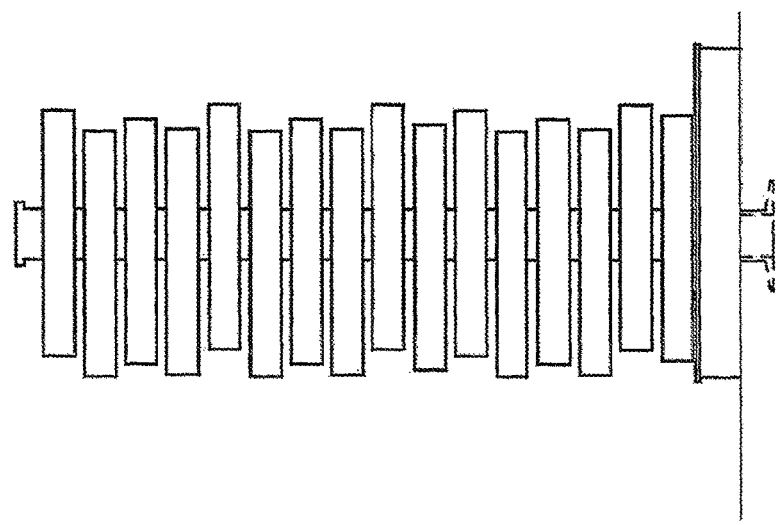
FIG. 8 is an elevation view of the rotatable building structure of this invention showing a variable building profile formed by a plurality of floor units mounted along a horizontal plane asymmetrically with respect to the central core.

Referring next to FIG. 2, there is shown in plan view of a central core 14, preferably cylindrical in shape, and constructed of reinforced concrete, structural steel or equivalent materials. A platform 22 is attached to or formed integrally with the central core 14. The core 14 is designed to support the total live and dead load of the floor units 12. The floor units 12 surround the core 14 and provide for balanced load transfer to the core 14. The floor units 12 can be non uniform shapes and/or mounted asymmetrically with respect to the central core 14, as for example, is shown in FIG. 8, with a counterweight applied to achieve balanced loading. It should be noted that this later arrangement of floor units 12 will provide a variable building profile during rotation. As will be further noted, the floor units 12 can be connected along a horizontal plane to form floor levels at incremental vertical heights along the central core 14 and are supported in cantilever fashion from the central core 14. In the event of seismic loading, the free ends of the respective floor units 12 may be subjected to movement without resulting in stress fracture, as may be the case if the separate floor levels were interconnected.

The mechanical/electrical components such as an elevator shaft 16, an emergency stairway 18; HVAC, water supply systems, trash disposal, electrical power cables, and utilities, such as, telephone, computer, television, jointly designated 20, are housed within the central core 14. It should also be noted that the core 14 has an opening (not shown) to provide a passageway from the platform 22 to the interior of the core 14, for example, for occupants to access the elevator shaft 16.

Figure 3:
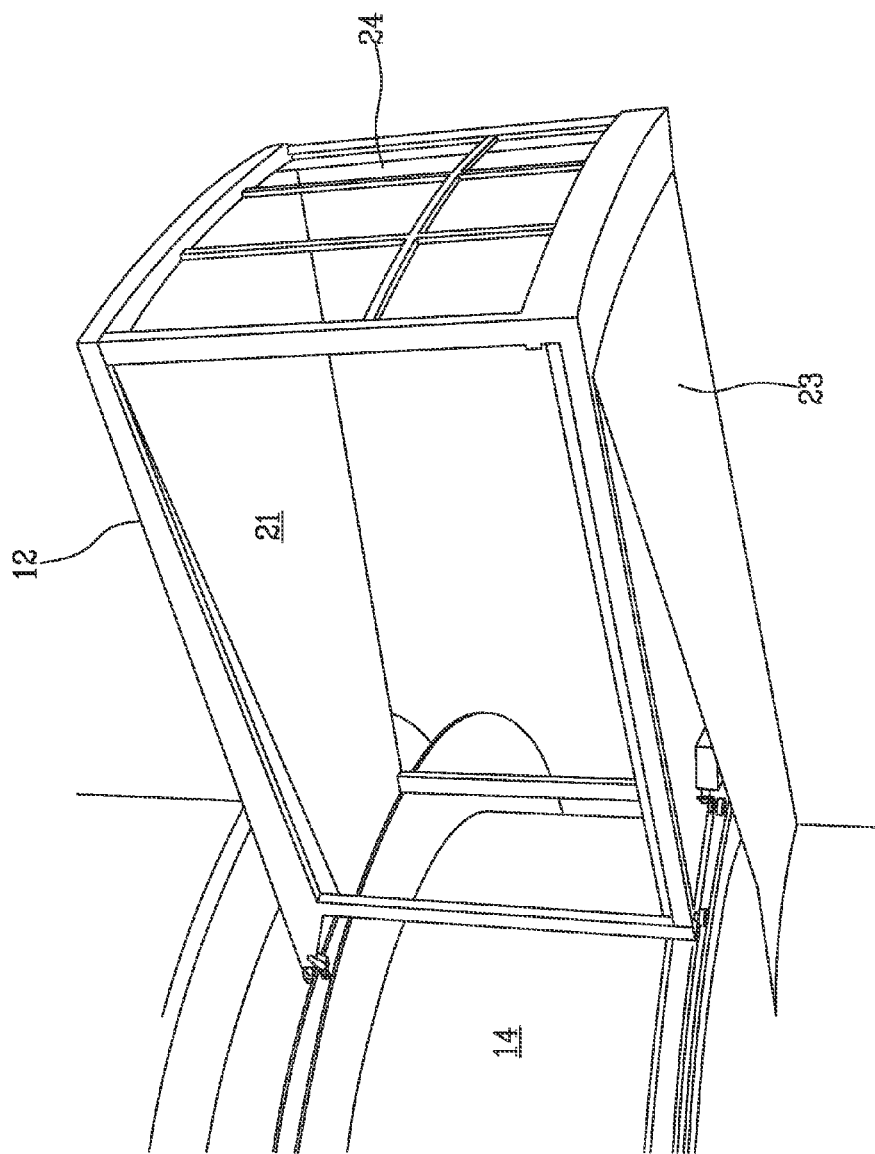
FIG. 3 is a perspective view of the rotatable building structure of this invention showing a floor unit suspended from the central core.

As further noted in FIG. 3, in this preferred embodiment, the floor unit 12 is substantially a wedge-shaped, open-frame segment that is preferably fabricated of structural steel, aluminum, fiber carbon, a combination of the above, however, other materials may be suitably utilized. A plurality of connected floor units 12 are designed to encircle the core 14 to provide a circular periphery. A roof member 21 and a floor member 23 are secured to the frame segment to form an enclosure. Note that a portion of the floor member 23 as shown in FIG. 3 has been displaced to better illustrate the connection to the core 14. The floor unit 12 also has a peripheral exterior curved boundary wall 24, preferably made of a transparent material, for providing maximum visibility from within the floor unit 12 and an interior boundary wall (not shown) adjacent the platform 22 with an occupant passageway through the interior boundary wall for accessing the platform 22.

Figure 4:
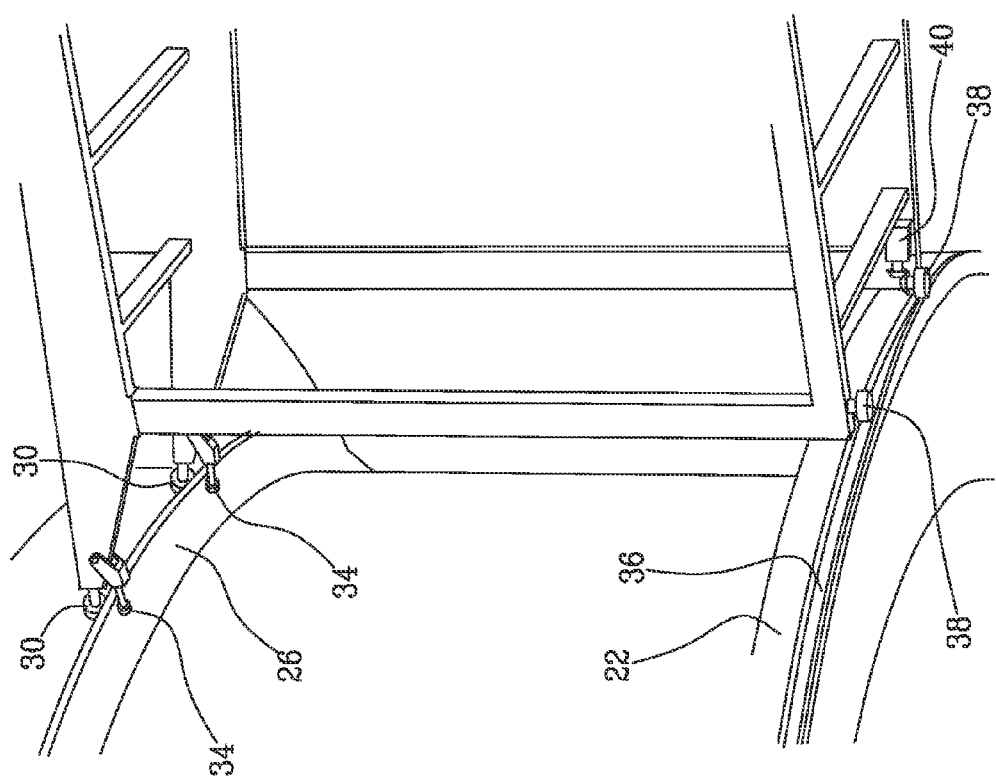
FIG. 4 is a perspective view of the rotatable building structure of this invention detailing the attachment of the floor unit to a respective upper and a lower rail or an other support system for supporting the floor unit.
Figure 5:
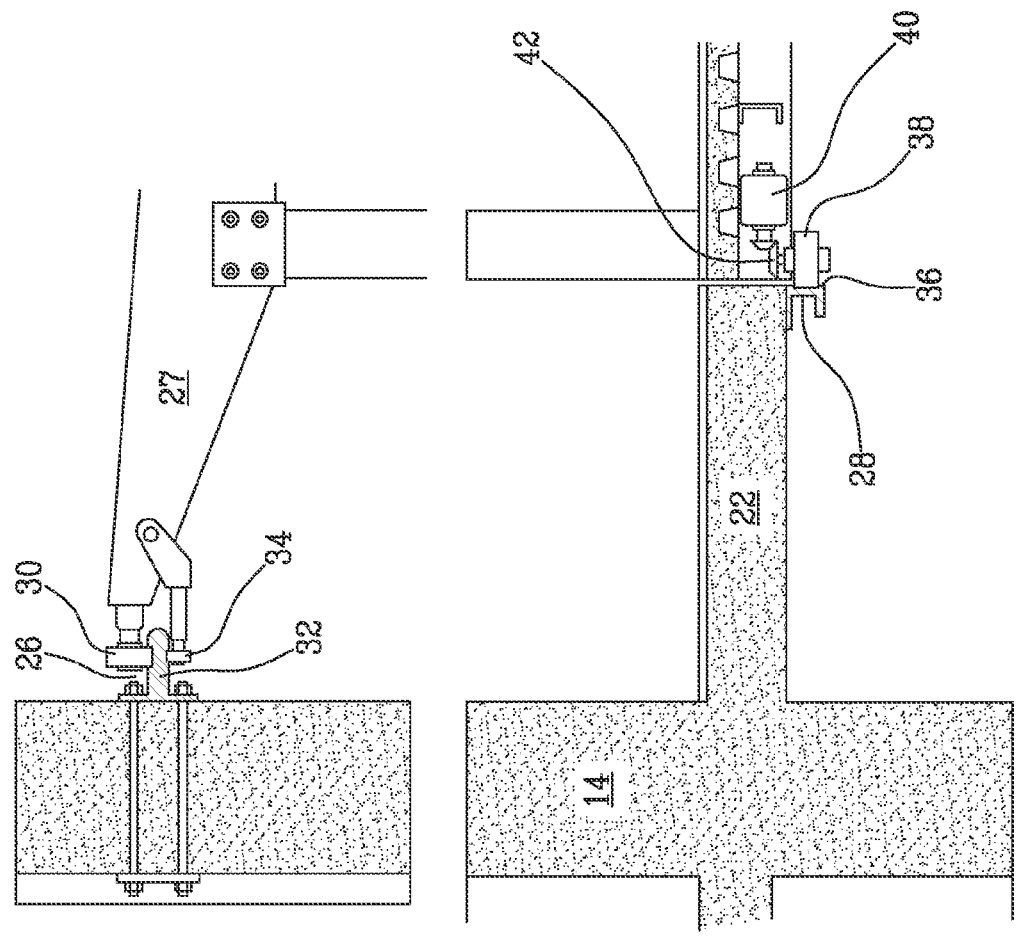
FIG. 5 is a sectional view of the rotatable building structure of this invention, showing in detail the central core, the platform, the upper rail, the lower rail, and a motor drive for displacing the floor unit.

Concerning next the securement of the floor units 20 to the central core 14, there is provided an upper rail 26 and a lower rail 28, as shown in FIGS. 3, 4 and 5, designed for supporting the floor unit 12. With regard to rotational displacement of the floor unit 12, a roller bearing 30 is mounted to a distal end of an arm 27 extending from the roof member 21. The roller bearing 30 is adapted to ride within a raceway 32 defined by the upper rail 26. A safety lock 34, also extending from the arm 27, is positionable below the raceway 32 for securing the roller bearing 30 in the raceway 32. Another raceway 36 is defined in the lower rail 28 and is adapted to accommodating a drive wheel 38. The drive wheel 38 is actuated by an electric motor 40 mechanically linked to the drive wheel 38 by a beveled gear arrangement 42 or by other drive force. The gear ratio can be designed to the operating specifications. The motor drive 40 can also be computer operated by command at selected speeds and directions for displacing the floor unit 12 in either a clockwise or counterclockwise direction. The support and the Movement of the floor can however be hydraulic, air cushion or of magnetic force.

Although the floor unit 12 has been described as defining a circular periphery surrounding the core 14, alternative floor unit configurations e.g. square, ellipsoid, or non-symmetric shapes are within the scope of this invention, and will provide a continually changeable building profile during displacement. It should also be noted that the radial dimension of the floor units 12 can be varied, for example, from floor level to floor level, so as to create a variable building profile. Additionally, the exterior boundary wall 24 can be aerodynamically designed and selectively positionable for reducing wind load, especially during hurricanes.

It is also within the scope of this invention to employ prefabricated floor units 12, with the respective unit containing factory-furnished interiors of an apartment, a hotel room, an office space, such as partition walls, floors, mechanical equipment, HVAC, plumbing connections, electrical connections, and the like.

These units, completely finished in an assembly facility will be as big as possible allowing easy transportation. The advantages will be by getting high quality of finishing, faster installation, safer installation work, clean environmental conditions at the site and cost savings.

With reference to FIG. 15, the prefabricated units will be arriving to the site and then lifted to the proper floor level and then fixed to the core and one to the other creating a complete and monolithic structural floor. The works will be limited at this point to the mechanical connection of the Units, the main electric, water HVAC and other utilities.

Figure 5A:
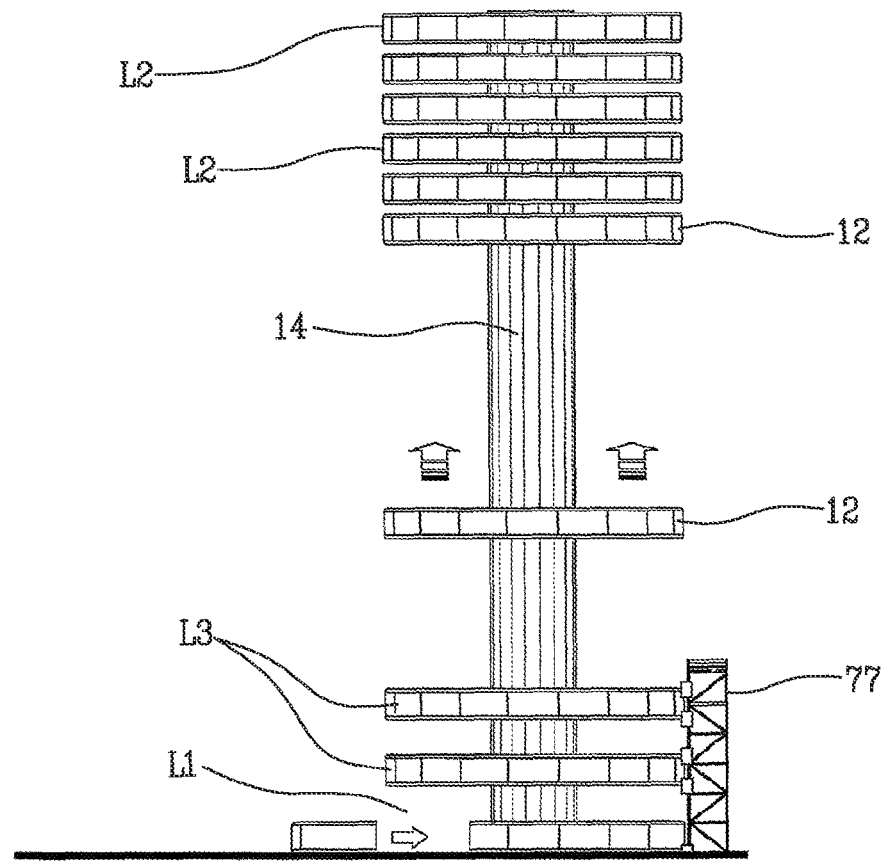
FIG. 5a is a schematic view of the building made of prefabricated single modular or not units that get assembled one to the other on the ground floor and then the entire floor get lifted up for final fixing to the proper floor level. The method allows to do the main assembling work of the units into a complete floor on ground level, then on the second and third level to complete the installation work, and do only the final connection on the upper level. The sequence of lifting the floors can follow the erection of the main core.

With reference to FIG. 5a is described finished prefabricated units will be arriving to the site, will be all connected between themselves creating a complete structural floor and connected to the core L1 and only then will be lifted up L2. The sequence will be of lifting first to the first and second floor L3, in order to allow to do all finishing and utilities main connections before erection to the final level L12. This sequence will allow to work from traditional low scaffolding or bridge tower 77 and leave for the installation on the top floors L2 only minor finishing activities.

Another advantage will be by gaining time as the first floors L3 can be installed parallel to the construction of the core 14.

Figure 5B:
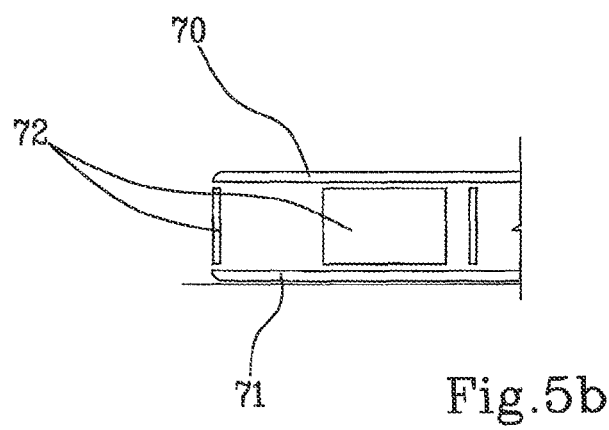
FIG. 5b is a schematic view of prefabricating floor units, roof units and vertical walls (curtain walls, partitions) and interior parts such as bathrooms and kitchens. Instead of complete units as above, the main idea is to create only the lower deck, the upper deck and vertical elements as a "kit" to be assembled on site. Following the main assembly on ground floor and the finishing on the second and third floor, and according to the speed of construction of the core, these finished floors will be lifted for final fixing on the proper level.
Figure 9:
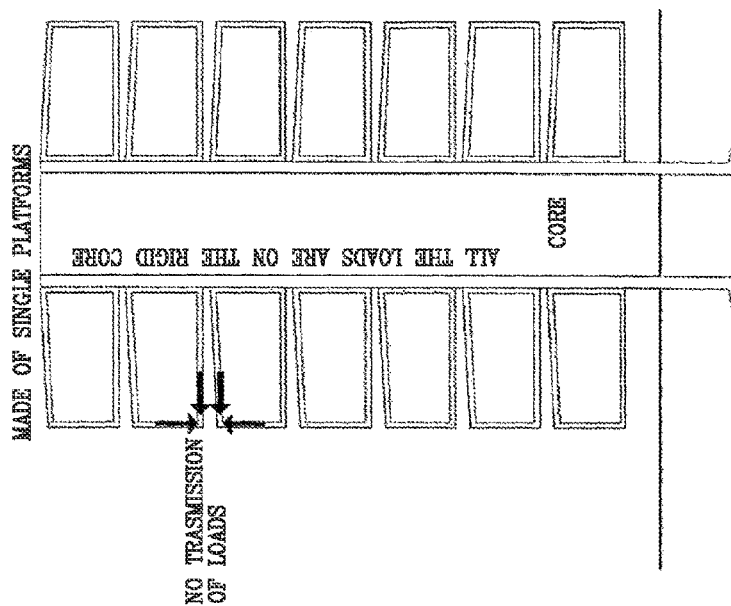
FIG. 9 is a schematic illustration showing that the single floors, being separate one from the other, are particularly resistant for seismic events as the horizontal and vertical forces do not cross one the other but are circulating in "continuous" direction.

With reference to FIG. 5b another prefabrication method is described, made instead of prefabricated modular or not modular complete units made of prefabricated structural floor elements 71 and roof units 70, vertical walls such as curtain walls and partitions 72 or interior parts such as bathrooms and kitchens. The main idea is to create only the lower structural deck, and an upper structural deck and vertical elements as a "kit" to be assembled on site. Following the main assembly on ground floor and the finishing on the second and third floor, and according to the speed of construction of the core, these finished floors will be lifted for final fixing on the proper level. Another advantage will be that the installation sequence of a complete floor of the building like in FIG. 5a start at a ground level L1 and go up to installation levels L3 of the floor. Each floor can be made of modular units composed at the lower level L1 before being lifted up to the respective final level L2, possibly with one or more intermediate levels L3 which can be used in connection with a bridge of tower 77 to allow workers to complete the installation of the floor before lifting.

With reference to FIG. 15a it is described the installation process of a whole pre-assembled floor which is lifted up along the core and then mechanically installed.

In this case the whole floor is assembled at the ground level and can be lifted to the second or third floor to allow finishing works while on the ground level a new floor is assembled.

These finished floors will be lifted up in a second moment to the proper destination level following the erection of the central core.

The advantage is that the important structural connections will be done on the ground floor, the finishing will be done on the second and third floor and therefore only very minor connections will be done on the top final floor at the destination level again making logistic easier and fasten the time of the erection of the building.

This method could be certainly make a lot of sense in case of office building where open spaces are required and therefore hardly any partitions will be required in any case. It will allow, in fact, sending to the site flat elements such as floor segments, roof segments, and curtain wall, the main bathrooms units and the very minimal possible vertical partitions.

FIG. 13 is a schematic illustration showing the plumbing system solution as the vertical piping system inside the core is fixed while the plumbing system of the single floors are rotating around. To allow such connection between the a fixed pipe and the rotating pipe there is one connection in each floor where the rotating pipe is inserted inside the fixed pipe in a way that one is fixed while the other one in partly inserted in the other one rotating around, allowing the water flow for clear water, for waist water or for air conditioning cold water to flow continuously.

With reference to FIG. 13, 13a-13b it is described a schematic illustration of a plumbing system of the building.

In the case shown by FIG. 13a, the plumbing system is provided by a first toroidal pipe 75 fixed the core unit 14 and a second toroidal pipe 76 fixed to a floor to allow fluid communication between the central unit pipe and the floor pipe. Pipes 75 and 76 act as two ring pipes inserted one into the other allowing continuity of water flow and in the same time to have different position of entry/exit pipes.

The rings are preferable joined by a suitable seal 79.

A different solution is shown in FIG. 13b that is a schematic illustration of a different plumbing system of the building in which a pipe fixed to the core having a number of connection fittings 82 (in this figure four fittings are indicated) while the rotating floor has its own pipes with its own connection fittings 74 situated in the same distance and parallel position. At a certain moment of the rotation the connection fittings correspond between themselves 73, the rotatable floor stop for a short time and the fittings get connected automatically allowing the liquids to flow from one side to the other. The rotatable part is equipped with one or more tanks that get filled during this short time in which the floor in not rotating.

A different solution for the plumbing system is shown in FIG. 13c. A flexible pipe 83 coming out 82 from the exterior side of the main core 75, is attached to the connection fitting on the rotatable floor 76. When the flexible pipe get completely stretched due to the movement of the rotatable floor the pipe 83 gets disconnected and automatically connected to the other rotating fitting creating a new connection for the flow of the liquids (or semi solid material). The exterior end of the pipe is motorized and inserted in a rail to facilitate its fast movement from one connection point 76 to the other one. Having two sets of such flexible pipe on each floor, will "cover" the short time between disattachment and attachment of the single flexible pipe guaranteeing continuous flow and water pressure in each single floor. A water tank on each floor may be installed on each rotating floor for a back up purpose.

In an alternate embodiment, wherein the same reference numerals have been used for designating corresponding parts of the previously described embodiment with the suffix "a", a floor unit 12a is connected to a central core 14a in a manner as described herein (see FIG. 6). In this embodiment, a wind tool 46 is shown deployed for providing a wind-power assist to the previously discussed motor drive. The wind tool 46 is comprised of a planar vane 48 hingedly connected to a spindle 50 mounted to a peripheral wall 24a of the floor unit 12a. The vane 48 can be remotely and/or directly actuated for deployment to an operational mode from a retracted mode housed within the floor unit 12a. A bar 52 provides a rotational limit stop to prevent further rotation of the vane 48 when in the fully deployed position. The wind tool 46 can alternatively be used for electrical power generation, for example, for recharging a backup battery system or going to the electric greed.

It is also within the scope of this invention to use the wind load on the exterior side of each single floor as power that will create energy to be used for the electric consumption of the building itself.

The rotation of each single floor will be determined by the tenant or the building management and will be achieved through the building electric power system, however when the wind blow and tend to rotate each single floor in the building, the monitored rotation of the floor (stopping or slowing down such wind force) creates resistance to the natural force of the wind load and therefore create energy that will be transformed to electrical energy to be used as part of the building consumption.

In addition, as shown in FIG. 11A the single floors, distance one from the other, will allow to have an horizontal "wind turbines" between each floor, of independent movement and separate from the floors themselves, This "wind turbines" will turn round due to the wind load and according to the wind velocity, creating electric power to be used as part of the building consumption or for selling electrical power to the electric company.

In addition, as shown in FIG. 12 this type of building has many roofs, equal to the number of the floors, and each roof will be covered with solar panels for the production of energy.

In a further alternate embodiment as shown in FIG. 7 wherein the same reference numerals have been used for designating corresponding parts of the previously described embodiment with the suffix "b", a floor unit 12b is connected to a central core 14b by a tension cable or steel strut 26b. A slidable anchor bearing 30b is attached at a distal end of the strut 26b. The anchor bearing 30b is contained within a slot 32b. The slot 32b extends on a horizontal plane, around the circumference of the central core 14b. The strut 26b is designed to support the floor unit 12b. A modified platform 22b projects under a portion of the floor unit 26b to provide additional support thereto and further includes a roller bearing 38b mounted in a track (not shown) or equivalent slide means for permitting displacement of the floor unit 26b along the platform 22b. It should further be apparent that since the independent floor units 12 at each floor level are each separated, for example, as noted in FIG. 1, any seismic force transmitted through the central core 14 would tend to be absorbed, in contrast to conventionally interconnected floors, and thus less likely to be subject the floor units 12 to stress failure. Also the aerodynamically designed and repositionable boundary wall 24 of the floor units 12 and the opening spacing between respective horizontal levels of floor units 12, substantially reduce the wind load applied as compared to a conventional vertical wall structure.

With reference to FIGS. 16 to 19, it is described a building 70 having a central structural portion 62 having preferably a cylindrical shape and made of reinforced concrete, steel or equivalent materials.

The central portion has a supporting function of a plurality of horizontal spaced floors 61.

The intermediate space provided between the floors allows to install a supporting structure 63 of lighting elements 64 within the intermediate space, able to rotate around the central portion.

Each lighting element can also be mounted on a telescopic rod 68 radialy arranged in respect to the vertical structure of the building, so that the lighting element can move towards and back from the building itself (reference arrows 69 as shown in FIG. 17).

Advantageously, night-time the synchronized movement of the lighting elements gives to an observer the impression that the building is moving or changing shape at any desired speed.

In greater details, in the embodiment shown in FIG. 16, the rotating structure 63 is supported by circular tracks 65 which are connected to the central structure of the building and that allow the rotating structure to rotate around the vertical axis of the building.

From FIG. 17 the central structure is shown designed to support any loads, both due to the floors and accidental loads, due to seismic loads or to the wind pressure.

Inside the central structure, vertical lifting systems 66 (stairs, lifters) and the plants rooms 67 are provided. The rotatable supporting structures 63 rotate around that central structure.

In FIG. 18 and FIG. 19 an embodiment of the invention is shown in which the lighting elements are arranged in every intermediate space of a multi-floor building, and in speed that has nothing to do with the rotation of the floors.

With reference to FIG. 20 lighting movable elements 81 are arranged on a building floor 12 to independently rotate in respect of the floor, being able to slide along a track 80 fixed to the floor or roof.

Advantageously, the more lighting elements are provided, the greater will be the impression of a movable building. Further, the radial motion due to the rotation of the structures between the floors, and the motion of the lighting elements towards and back from the building through the telescopic rods can be coordinated by an electronic unit in order to obtain predetermined optical effects.

It should thus be seen that there is provided a rotatable building structure which achieves the various objects of this invention and which is well adapted to meet conditions of practical use.

Since various possible embodiments might be made of the present invention or modifications might be made to the exemplary embodiments above set forth, it is to be understood that all materials shown and described in the accompanying drawings are to be interpreted as illustrative and not in a limiting sense.

The invention claimed is:

1. A rotatable building structure comprising:
   at least one central core;
   a plurality of floor units attached to said central core, one or more of said floor units being an individually rotatable floor unit in rotatable displacement about the central core with the central core passing through each individually rotatable floor unit and each individually rotatable floor unit moving independently from floor units above and below said respective individually rotatable floor unit, said one or more individually rotatable floor units having a cross sectional plan view with outermost exterior perimeter points that are a non-uniform distance from said central core and with an exterior circumference in its entirety is visible from the exterior of the rotatable building structure at all times during rotation so that during rotation of the one or more individually rotatable floor units the outermost exterior perimeter points of the one or more individually rotatable floor units create a variable vertical external profile of the rotatable building structure;
   wherein said one or more individually rotatable floor units is accessible from the central core and has one or more of at least one living, hotel, office and/or commercial unit.

2. The rotatable building structure as claimed in claim 1, wherein the rotatable building structure comprises means to convert wind energy into electrical power.

3. The rotatable building structure as claimed in claim 1, wherein said plurality of floor units comprising multiple consecutive levels of individually rotatable floor units having cross sectional plan views with outermost exterior perimeter points that are a non-uniform distance from the central core, each level of individually rotatable floor units being independently displaceable.

4. The rotatable building structure as claimed in claim 1, wherein one or more annular platforms provide accessibility to said one or more individually rotatable floor units from the central core.

5. The rotatable building structure as claimed in claim 4, wherein the one or more annular platforms extends below and partially supports the one or more individually rotatable floor units.

6. The rotatable building structure as claimed in claim 5, further comprising an interface between the one or more annular platforms and the one or more individually rotatable floor units includes slide means for permitting displacement of the one or more individually rotatable floor units along the one or more annular platforms.

7. The rotatable building structure as claimed in claim 1, wherein the one or more individually rotatable floor units are rotatable independent of one or more adjacent floor units of said plurality of floor units.

8. The rotatable building structure as claimed in claim 1, wherein the central core includes at least one supporting structure adapted to support the one or more individually rotatable floor units, the one or more individually rotatable floor units further being displaceable along said rotatable building structure.

9. The rotatable building structure as claimed in claim 1, wherein the cross sectional plan view of each individually rotatable floor unit attached to the central core are taken from the group consisting of non-uniform shapes and asymmetrically mounted floor units about the central core for providing the variable vertical exterior profile during rotation of the one or more individually rotatable floor units.

10. The rotatable building structure as claimed in claim 1, wherein said central core has an interior, said plurality of floor units suspended from and surrounding the central core, said plurality of floor units being positionable at vertical increments along the central core corresponding to floor levels, one or more annular platforms fixedly connected to the central core, said one or more annular platforms corresponding to one or more of the respective floor units and being accessible from the floor units, said central core further having a passageway from the one or more annular platforms to the interior of the central core.

11. The rotatable building structure as claimed as claimed in claim 1, wherein the central core has an interior that contains at least one of an elevator shaft and a stairway.

12. The rotatable building structure as claimed in claim 1, wherein the one or more individually rotatable floor units are suspended from and/or positioned on at least one rail member mounted to the central core and include a roller bearing for cooperative interaction with the rail member for rotational displacement of the one or more individually rotatable floor units.

13. The rotatable building structure as claimed in claim 1, further comprises a wind tool deployable from at least one of said one or more individually rotatable floor units for providing a wind generated force.

14. The rotatable building structure as claimed in claim 1, wherein the one or more individually rotatable floor units are connected on a horizontal plane with respect to the central core at selected heights along the central core.

15. The rotatable building structure as claimed in claim 14, wherein the selected heights for mounting the one or more individually rotatable floor units are asymmetrical.

16. The rotatable building structure as claimed in claim 1, wherein the one or more individually rotatable floor units define a peripheral boundary wall, said periphery boundary wall being aerodynamically designed and selectively repositionable for reducing the effect of wind loads in a case of a storm or hurricane.

17. The rotatable building structure as claimed in claim 1, wherein at least one floor unit of said plurality of floor units is provided with solar panels.

18. The rotatable building structure as claimed in claim 17, wherein each floor unit is provided with solar panels.

19. The rotatable building structure as claimed in claim 1, wherein a wind-power generator is mounted to the central core.

20. The rotatable building structure as claimed in claim 1, wherein a wind-power generator is rotationally mounted between two of the floor units.

21. The rotatable building structure as claimed in claim 20, wherein the wind-power generator includes one or more arcuate shovel blades for intercepting wind to generate a unidirectional rotational force.

22. The rotatable building structure as claimed in claim 1, comprising a plurality of wind-power generators each mounted between two of the floor units, where the two floor units are different for each wind power generator.

23. The rotatable building structure as claimed in claim 22, wherein the wind generators move independently from the floor units themselves, and will turn due to a wind load and according to a wind velocity.

24. The rotatable building structure as claimed in claim 1, further comprising means to convert a resistance to a movement created by a wind load on the building structure into electrical energy.

25. The rotatable building structure as claimed in claim 1, further comprising a plumbing system wherein a connection of pipes between the one or more rotatable floor units and the central core comprises a first toroidal pipe fixed to the central core and having a partial opening, and at least one second pipe fixed to the one or more individually rotatable floor units that is sealingly connected with the partial opening to allow a flow of clear water, waste, or air conditioning cold water to flow between the first toroidal pipe and the second pipe.

26. The rotatable building structure as claimed in claim 25, in which the second pipe is a toroidal pipe fixed to the one more individually rotatable floor units and having a partial opening communicating and sealingly connected to the partial opening of the first toroidal pipe in order to allow fluid communication between the first toroidal pipe and the second pipe, the first toroidal pipe and the second pipe acting as one pipe sliding one into the other allowing exit and entry connections to vary their mutual position.

27. The rotatable building structure as claimed in claim 1, further comprising a plumbing system comprising a toroidal pipe fixed to the central core and connected with one or more corresponding pipes of a floor trough connection which are arranged at predetermined positions to allow fluid communication between the toroidal pipe and the one or more corresponding pipes in given positions when rotation stops for a short time, allowing the one ore more corresponding pipes situated on the one or more individually rotatable floor units to feed a tank that will be positioned in the rotatable building structure.

28. The rotatable building structure as claimed in claim 1, further comprising a plumbing system comprising a toroidal pipe fixed to the central core and connected with at least one flexible pipe of the one or more individually rotatable floor units through one or more movable connections arranged to allow fluid communication between the toroidal pipe of the central core and the at least one flexible pipe, the one or more movable connections being capable of being automatically shut and disconnected when they are close to being completely stretched and automatically connected and opened when arriving at another connection thereby avoiding stoppage of rotation of the one or more individually rotatable floor units.

29. The rotatable building structure as claimed in claim 1, further comprising: one or more lighting elements arranged to independently rotate around the central core of the rotatable building structure in order to produce the optical effect of motion or change of shape of the building according to the position and the speed of rotation of the one or more lighting elements.

30. The rotatable building structure as claimed in claim 29, further comprising:
an intermediate space between adjacent floor units of the plurality of floor units;
a rotatable supporting structure on which the lighting elements are arranged within the intermediate space;
the one or more lighting elements on the supporting structure capable of rotating at a speed the same as or different from a speed created by a movement of the one more individually rotatable floor units themselves.

31. The rotatable building structure as claimed in claim 30, wherein said one or more lighting elements can move towards and back from the central core.

32. The rotatable building structure as claimed in claim 31, wherein said lighting element are connected to telescopic rods radially arranged in respect to a building vertical axis.

33. The rotatable building structure as claimed in claim 29, further comprising a supporting structure of lighting elements rotatably supported on or more of the floor units.

34. The rotatable building structure as claimed in claim 29, wherein motion of said lighting elements is configured to be synchronized.

35. The building structure of claim 1 wherein the floor units are prefabricated modular components configured to be composed at a lower level and lifted up to a destination level along the central core to be fixed to the central core.

36. The building structure as claimed in claim 1, wherein the floor units are prefabricated modular components, each floor unit is configured to be lifted up along the central core to an installation level and then fixed to the central core to create the floor unit at the installation level.

37. The building structure as claimed in claim 36, wherein the floor units are made of modular units each comprising a lower deck and an upper deck with partition walls of separate pre-assembled units configured to be installed on a temporary level, before lifting the respective floor unit to an installation level.

38. The building structure as claimed in claim 36, wherein the prefabricated modular components are made of steel, aluminum, carbon or any combinations thereof.

39. The building structure as claimed in claim 1, wherein each floor unit is configured assembled at a ground level, lifted up as a unit along the central core and fixed to the central core at an installation level.

40. The building structure as claimed in claim 1 further comprising a drive mechanism which provides a drive force to at least one of the one or more individually rotatable floor units to rotate the one or more individually rotatable floor units with respect to the central core at a user selected speed and direction.

41. The building structure as claimed in claim 40 wherein the drive mechanism is computer controlled.

42. The building structure as claimed in claim 1 wherein the at least one living, hotel, office and/or commercial unit has one or more electrical connections.

43. The building structure as claimed in claim 1 wherein the at least one living, hotel, office and/or commercial unit has one or more plumbing connections from the one or more individually rotatable floor units to a central unit pipe in the central core.

* * * * *